(12) United States Patent
Adachi et al.

(10) Patent No.: US 6,473,686 B2
(45) Date of Patent: Oct. 29, 2002

(54) AUTOMATIC VEHICULAR VELOCITY CONTROL APPARATUS FOR AUTOMOTIVE VEHICLE

(75) Inventors: Kazutaka Adachi, Yokohama (JP); Takenori Hashizume, Kanagawa (JP); Hideo Iwamoto, Kanagawa (JP)

(73) Assignee: Nissan Motor Co., Ltd., Kanwgawa (JP)

( * ) Notice: Subject to any disclaimer, the term of this patent is extended or adjusted under 35 U.S.C. 154(b) by 0 days.

(21) Appl. No.: 09/987,891

(22) Filed: Nov. 16, 2001

(65) Prior Publication Data

US 2002/0055813 A1 May 9, 2002

Related U.S. Application Data

(62) Division of application No. 09/384,292, filed on Aug. 26, 1999, now Pat. No. 6,330,507.

(30) Foreign Application Priority Data

Aug. 26, 1998 (JP) .......................................... 10-240180
Jun. 14, 1999 (JP) .......................................... 11-166828

(51) Int. Cl.[7] .............................. B00T 7/12; B60Q 1/00; G01S 13/00
(52) U.S. Cl. ........................... 701/96; 701/93; 180/169; 180/170; 342/70; 340/435; 340/436; 340/903
(58) Field of Search ...................... 701/96, 93; 180/169, 180/170; 342/70; 340/435, 436, 903

(56) References Cited

U.S. PATENT DOCUMENTS

| 3,820,622 A | 6/1974 | Powell ........................ 180/169 |
| 5,053,979 A | 10/1991 | Etoh ........................... 700/304 |

(List continued on next page.)

FOREIGN PATENT DOCUMENTS

| DE | 196 54 769 A1 | 7/1998 |
| DE | 198 48 824 A1 | 5/1999 |

(List continued on next page.)

OTHER PUBLICATIONS

"A controller for autonomous intelligent cruise control—a preliminary design", A. Eliasson et al., Proceedings of the Vehicle Navigation & Information Systems Conference, U.S., New York, Sep. 2, 1992, pp. 170–175.

*Primary Examiner*—Jacques H. Louis-Jacques
*Assistant Examiner*—Brian J. Broadhead
(74) *Attorney, Agent, or Firm*—McDermott, Will & Emery

(57) ABSTRACT

In an automatic vehicular velocity control apparatus for an automotive vehicle, a relative velocity detector is provided to detect a relative velocity of a preceding vehicle to the vehicle, an inter-vehicle distance command value calculator is provided to calculate an inter-vehicle distance command value, a control response characteristic determinator is provided to determine a control response characteristic of the inter-vehicle distance control system according to a deviation from the inter-vehicle distance command value to a detected value of the inter-vehicle distance and a detected value of the relative velocity, a vehicular velocity command value calculator is provided to calculate a vehicular velocity command value on the basis of the determined control response characteristic of the inter-vehicle distance control system, and a vehicular velocity control section is provided to control at least one of a driving force of the vehicle, a braking force of the vehicle, and a gear ratio of a transmission in such a manner that a detected value of the vehicular velocity is made coincident with the vehicular velocity command value. The control response characteristic determinator includes maps representing a relationships of a specific angular frequency $\omega_M$ (or $\omega c$) with respect to the relative velocity $\Delta V$ and an inter-vehicle distance deviation $\Delta L$ and a damping factor $\zeta M$ (or $\zeta c$) with respect to the relative velocity and the inter-vehicle distance deviation.

10 Claims, 23 Drawing Sheets

U.S. PATENT DOCUMENTS

| | | | |
|---|---|---|---|
| 5,177,462 A | 1/1993 | Kajiwara | 340/435 |
| 5,375,060 A | 12/1994 | Nocker | 701/301 |
| 5,493,302 A | 2/1996 | Woll et al. | 342/71 |
| 5,529,139 A | 6/1996 | Kurahashi et al. | 180/169 |
| 5,839,534 A | 11/1998 | Chakraborty et al. | 180/169 |
| 5,959,572 A | 9/1999 | Higashimata et al. | 342/70 |
| 5,969,640 A | 10/1999 | Timm et al. | 340/903 |
| 6,256,573 B1 * | 7/2001 | Higashimata | 180/167 |
| 6,269,298 B1 * | 7/2001 | Seto | 342/69 |
| 6,301,542 B1 * | 10/2001 | Kirchberger et al. | 340/903 |
| 6,311,120 B1 * | 10/2001 | Asada | 340/903 |
| 6,311,121 B1 * | 10/2001 | Kuragaki et al. | 180/167 |
| 6,330,507 B1 * | 12/2001 | Adachi et al. | 180/169 |

FOREIGN PATENT DOCUMENTS

| | | |
|---|---|---|
| EP | 0 612 641 A1 | 8/1994 |
| JP | 6-227280 | 8/1994 |
| JP | 10-272963 | 10/1998 |
| JP | 11-59222 | 3/1999 |
| JP | 11-123952 | 5/1999 |
| WO | WO 99/20481 | 4/1999 |

\* cited by examiner

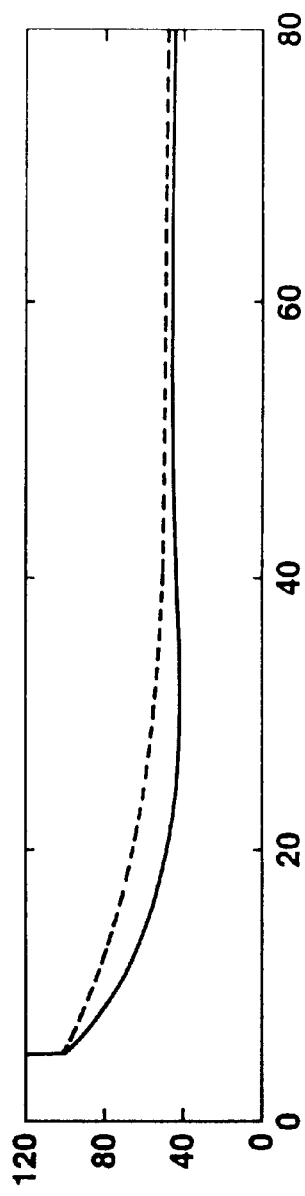
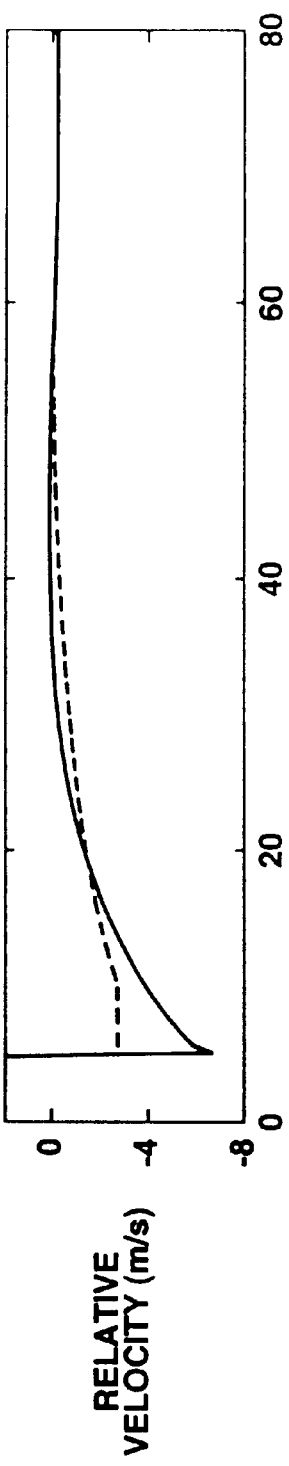
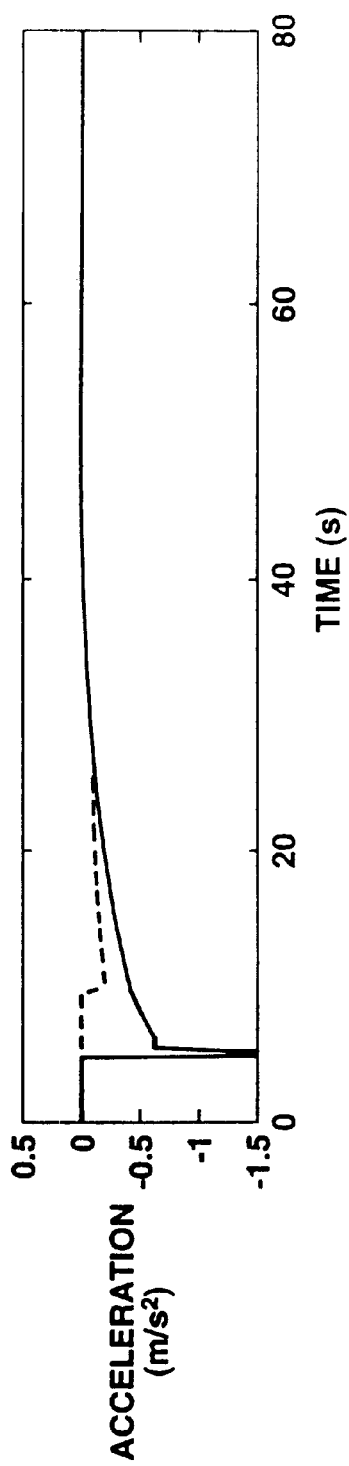
FIG.5A INTER-VEHICLE DISTANCE (m)
FIG.5B RELATIVE VELOCITY (m/s)
FIG.5C ACCELERATION (m/s²)

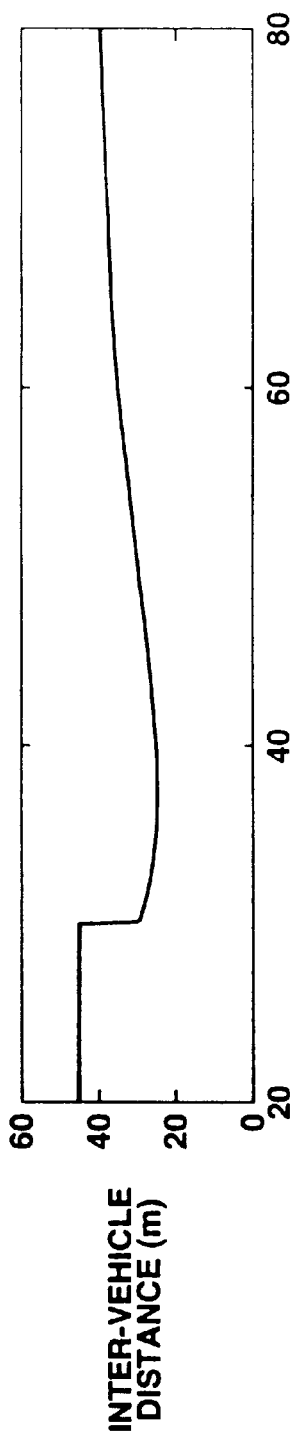
FIG.7A INTER-VEHICLE DISTANCE (m)
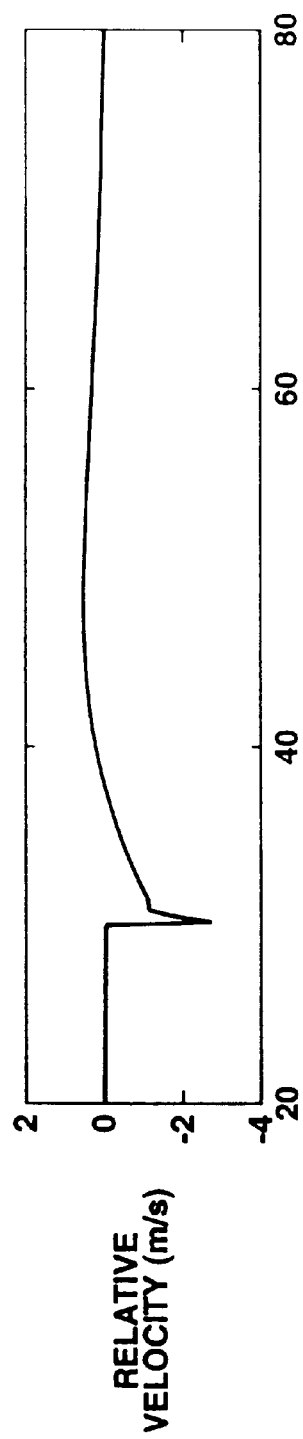
FIG.7B RELATIVE VELOCITY (m/s)
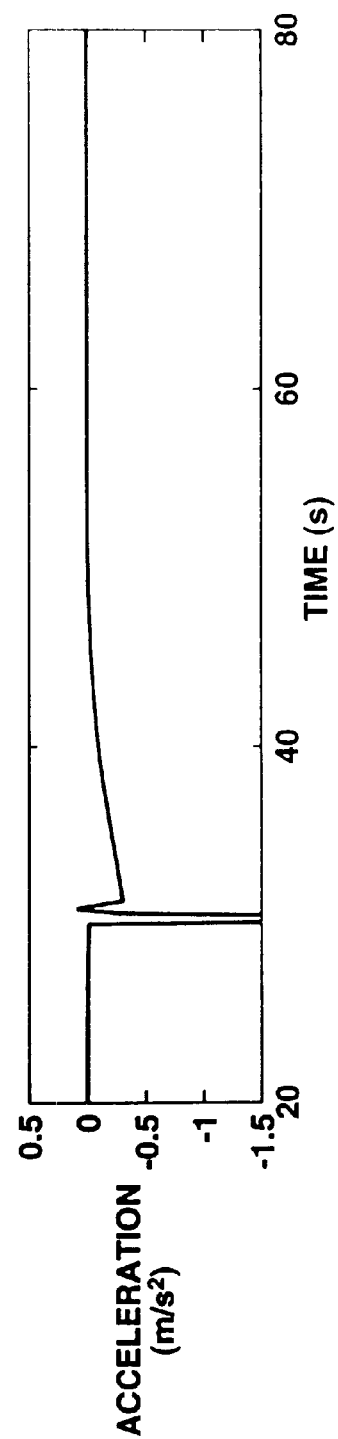
FIG.7C ACCELERATION (m/s²)

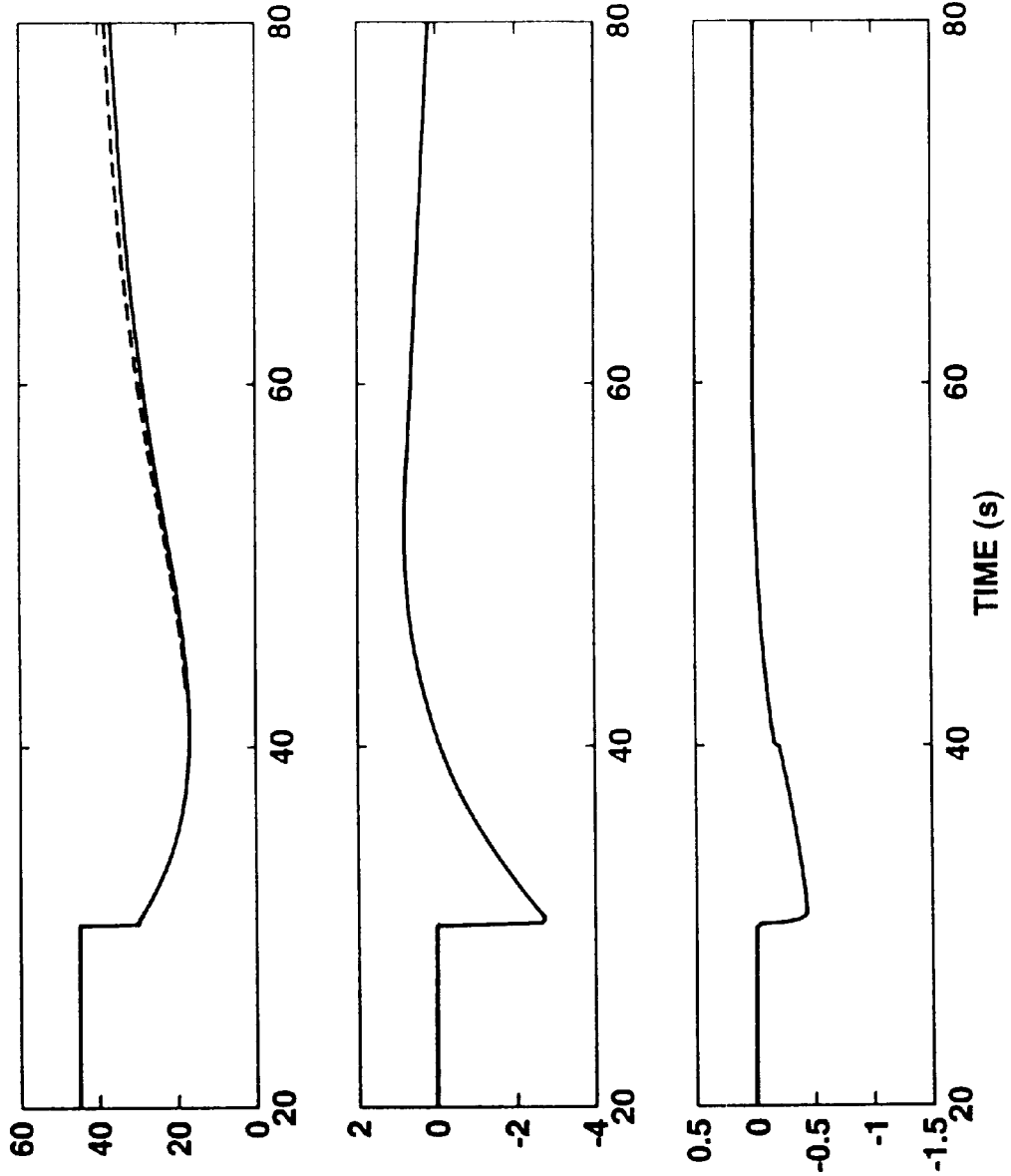

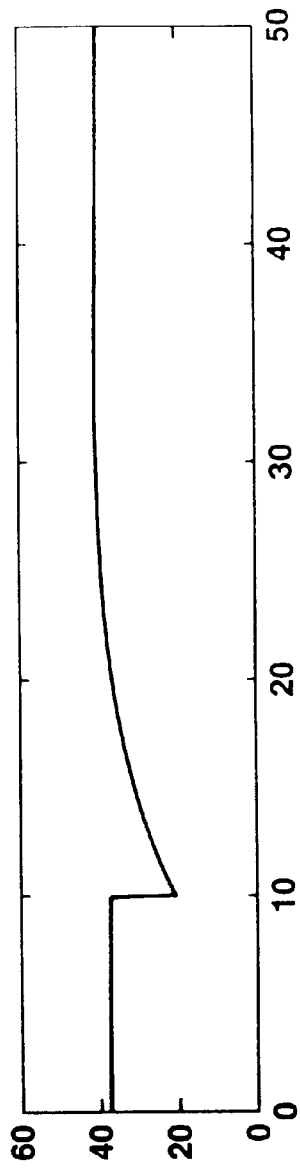
FIG.9A INTER-VEHICLE DISTANCE (m)
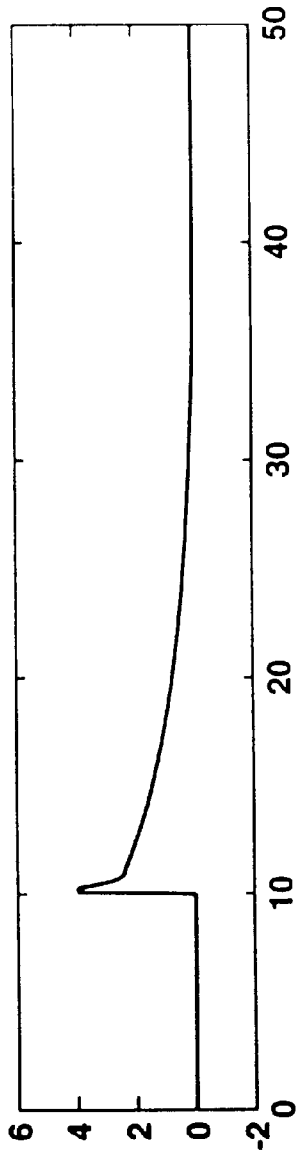
FIG.9B RELATIVE VELOCITY (m/s)
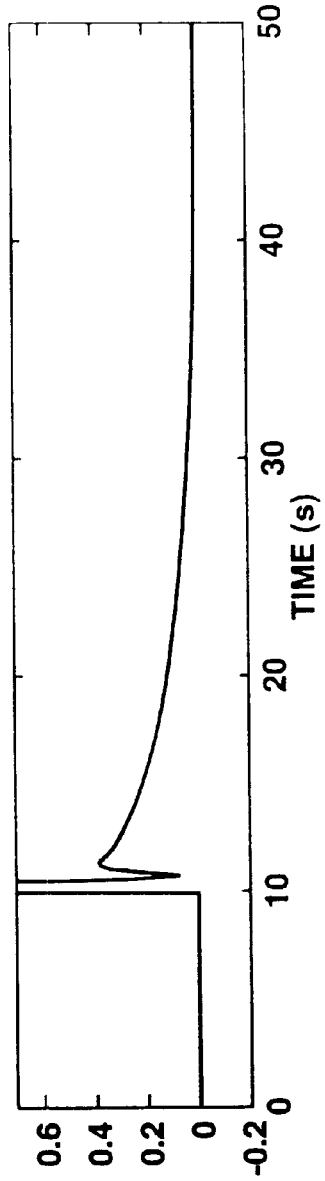
FIG.9C ACCELERATION (m/s²)

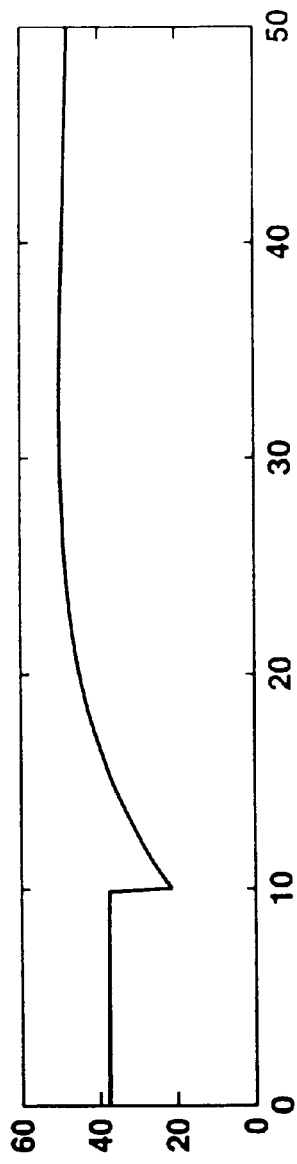
FIG.10A INTER-VEHICLE DISTANCE (m)
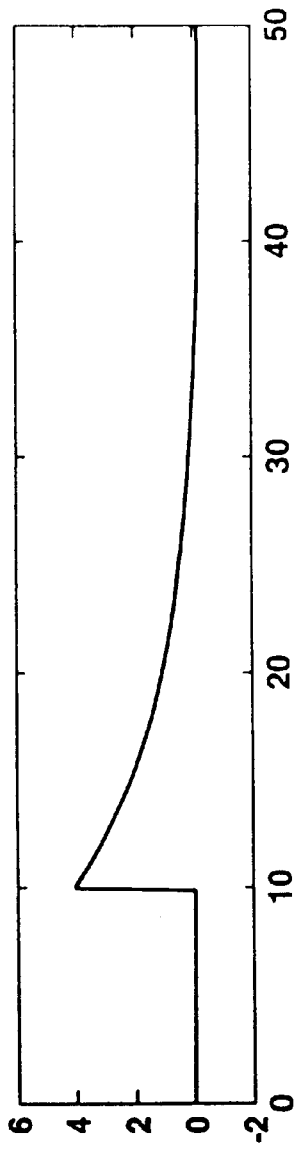
FIG.10B RELATIVE VELOCITY (m/s)
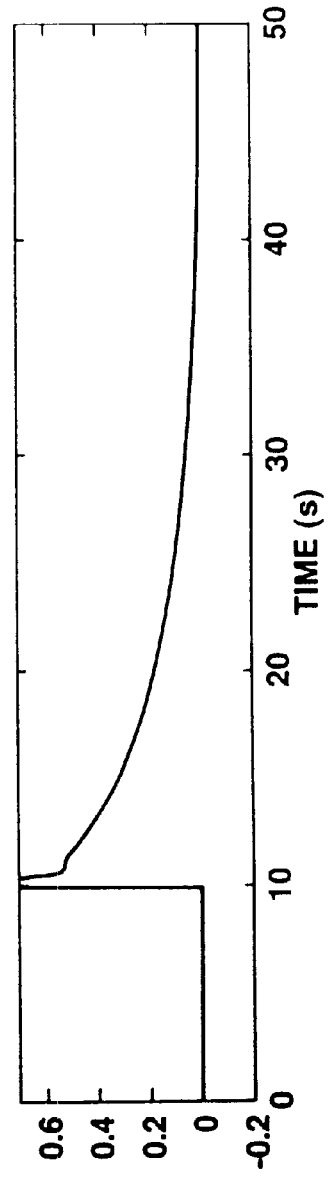
FIG.10C ACCELERATION (m/s²)

INTER-VEHICLE DISTANCE (m)

RELATIVE VELOCITY (m/s)

VEHICULAR VELOCITY (km/h)

ACCELERATION (m/s²)

AUTOMATIC VEHICULAR VELOCITY CONTROL APPARATUS FOR AUTOMOTIVE VEHICLE

This application is a divisional of U.S. patent application Ser. No. 09/384,292, filed Aug. 26, 1999 now U.S. Pat. No. 6,330,507.

BACKGROUND OF THE INVENTION a) Field of the Invention

The present invention relates to an automatic vehicular velocity control apparatus for an automotive vehicle to follow up a preceding vehicle which is running ahead of the vehicle at an appropriate inter-vehicle distance when the preceding vehicle has been recognized.

b) Description of the Related Art

A Japanese Patent Application First Publication No. Heisei 11-59222 published on Mar. 12, 1999 exemplifies a previously proposed automatic vehicular velocity control apparatus to follow up a preceding vehicle which is running ahead of the vehicle at the same traffic lane at an appropriate inter-vehicle distance.

In the above-described control apparatus, a preceding vehicle follow-up run control system is constituted by an inter-vehicle distance control system and a vehicular velocity control system. A first gain fd by which an inter-vehicle distance deviation $\Delta L$ is multiplied and a second gain fv by which a relative velocity $\Delta V$ of the vehicle to the preceding vehicle is multiplied are set on the basis of a specific angular frequency $\omega M$ and a damping factor $\zeta M$ in a transfer function of the preceding vehicle follow-up run control system, a target relative velocity V* is calculated as follows: $\Delta V^* = (fd \times \Delta L + fv \times \Delta V)$, and a target vehicular velocity V* is calculated by subtracting the target relative velocity $\Delta V^*$ from the vehicular velocity $V_T$ of the preceding vehicle.

Then, if both of the first gain fd and the second gain fv are modified according to the detected value of the inter-vehicle distance, the response characteristic of the inter-vehicle distance control system is modified.

SUMMARY OF THE INVENTION

However, since the response characteristic of the inter-vehicle distance control system is modified only by means of the detected value of the inter-vehicle distance, the following problems occur in the previously proposed automatic vehicular velocity control apparatus described in the BACKGROUND OF THE INVENTION.

(1) Suppose that the vehicle has recognized the preceding vehicle at an inter-vehicle distance sufficiently longer than a set inter-vehicle distance and is about to approach to the preceding vehicle whose vehicular velocity is lower than that of the vehicle up to the set inter-vehicle distance. An abrupt deceleration is, in this case, carried out immediately after the preceding vehicle has been recognized even when the relative velocity of the vehicle to the preceding vehicle is large and the inter-vehicle distance when the preceding vehicle has just been recognized is sufficiently longer than the set inter-vehicle distance so that a vehicular run disagreeable to a vehicular occupant(s) occurs.

(2) Suppose that another vehicle has been interrupted into a spatial interval of a traffic lane between the preceding vehicle and the vehicle during the follow-up run of the vehicle to the preceding vehicle. Since the inter-vehicle distance between the other vehicle and the vehicle becomes abruptly shorter than the set inter-vehicle distance, the abrupt deceleration is carried out immediately after the interruption of the other vehicle to the spatial interval between the old preceding vehicle and the vehicle although the relative velocity of the vehicle to the other interrupting vehicle is almost zero.

(3) Furthermore, suppose that the vehicle itself has made a traffic lane change from a normal traffic lane on which the preceding vehicle was running ahead of the vehicle to an overtake traffic lane on which an overtake vehicle is running ahead of the vehicle and the vehicle is to follow up the overtake vehicle which is the new preceding vehicle.

If the inter-vehicle distance to the new preceding vehicle is shorter than the set inter-vehicle distance, the abrupt deceleration of the vehicle is also carried out immediately after the follow-up run of the vehicle to the new preceding vehicle even if the vehicular velocity of the new preceding vehicle is higher than that of the vehicular velocity so that the vehicular run disagreeable to the vehicular occupant(s) occurs.

It is therefore an object of the present invention to provide an improved automatic vehicular velocity control apparatus for an automotive vehicle which can achieve a smooth start for the vehicle to appropriately follow up a preceding vehicle which is running ahead of the vehicle with no driving anxiety given to the vehicular occupants with an avoidance of the abrupt deceleration described above.

According to one aspect of the present invention, there is provided with an automatic vehicular velocity control apparatus for an automotive vehicle, comprising: an inter-vehicle distance detector to detect an inter-vehicle distance from the vehicle to a preceding vehicle which is running ahead of the vehicle; a vehicular velocity detector to detect a vehicular velocity of the vehicle; a relative velocity detector to detect a relative velocity of the preceding vehicle to the vehicle; an inter-vehicle distance command value calculator to calculate a command value of the inter-vehicle distance; a control response characteristic determinator to determine a control response characteristic of an inter-vehicle distance control system in accordance with to a deviation between the command value of the inter-vehicle distance and a detected value thereof and a detected value of the relative velocity; a vehicular velocity command value calculator to calculate a command value of the vehicular velocity on the basis of the determined control response characteristic of the inter-vehicle distance control system; and a vehicular velocity control section to control at least one of a driving force of the vehicle, a braking force of the vehicle, and a gear ratio of a vehicular transmission in such a manner that a detected value of the vehicular velocity is made equal to the command value of the vehicular velocity.

According to another aspect of the present invention, there is provided with an automatic vehicular velocity control apparatus for an automotive vehicle, comprising: an inter-vehicle distance detector to detect an inter-vehicle distance from the vehicle to a preceding vehicle which is running ahead of the vehicle; a vehicular velocity detector to detect a vehicular velocity of the vehicle; a relative velocity detector to detect a relative velocity of the preceding vehicle to the vehicle; an inter-vehicle distance command value calculator to calculate a command value of an inter-vehicle distance; a target value determinator to determine a target value of the inter-vehicle distance prescribing a variation of the inter-vehicle distance with time until the detected value of the inter-vehicle distance has reached to the command value of the inter-vehicle distance; a gain determinator to determine a first gain by which a deviation between the target value of the inter-vehicle distance and the detected value of the inter-vehicle distance is multiplied in accordance with the detected value of the relative velocity; a vehicular velocity command value calculator to calculate a command value of the vehicular velocity to make the detected value of the inter-vehicle distance equal to the target value of the inter-vehicle distance on the basis of the detected value of the vehicular velocity, the detected value of the relative velocity, and the deviation between the target value of the inter-vehicle distance and the detected value thereof; and a vehicular velocity control section to control at least one of a driving force of the vehicle, a braking force of the vehicle, and a gear ratio of a vehicular transmission in such a manner that the detected value of the vehicular velocity is made equal to the command value thereof.

This summary of the invention does not necessarily describe all necessary features so that the present invention may also be a sub-combination of these described features.

BRIEF DESCRIPTION OF THE DRAWINGS:

FIGS. 5A, 5B, and 5C are simulation results in an inter-vehicle distance, a relative velocity, and an acceleration of a comparative example of the automatic vehicular velocity control apparatus when the vehicle is approaching to a preceding vehicle at a relatively long inter-vehicle distance as shown in FIG. 11.

FIGS. 7A, 7B, and 7C are simulation results in the inter-vehicle distance, the relative velocity, and the acceleration of the comparative example of the automatic vehicular velocity control apparatus when another vehicle is interrupted into a spatial interval between the preceding vehicle and the vehicle in the same situation as shown in FIG. 12.

FIGS. 8A, 8B, and 8C are simulation results in the inter-vehicle distance, the relative velocity, and the acceleration of the automatic vehicular velocity control apparatus in each of the first and second embodiments when the other vehicle is interrupted into the spatial interval between the preceding vehicle and the vehicle in the same situation as shown in FIG. 12.

FIGS. 9A, 9B, and 9C are simulation results in the inter-vehicle distance, the relative velocity, and the acceleration of the comparative example of the automatic vehicular velocity control apparatus in each of the first and second embodiments when the vehicle has made a traffic lane change to an overtake traffic lane at which the vehicle is running to follow up an overtake vehicle as a new preceding vehicle in the same situation as shown in FIG. 13.

FIGS. 10A, 10B, and 10C are simulation results in the inter-vehicle distance, the relative velocity, and the acceleration of the automatic vehicular velocity control apparatus when the vehicle has made the traffic lane change to the overtake traffic lane at which the vehicle is running to follow up the overtake vehicle as the new preceding vehicle in the same situation as shown in FIG. 13.

DETAILED DESCRIPTION OF THE PREFERRED EMBODIMENTS

Reference will hereinafter be made to the drawings in order to facilitate a better understanding of the present invention.

(First Embodiment)

Figure 1A:
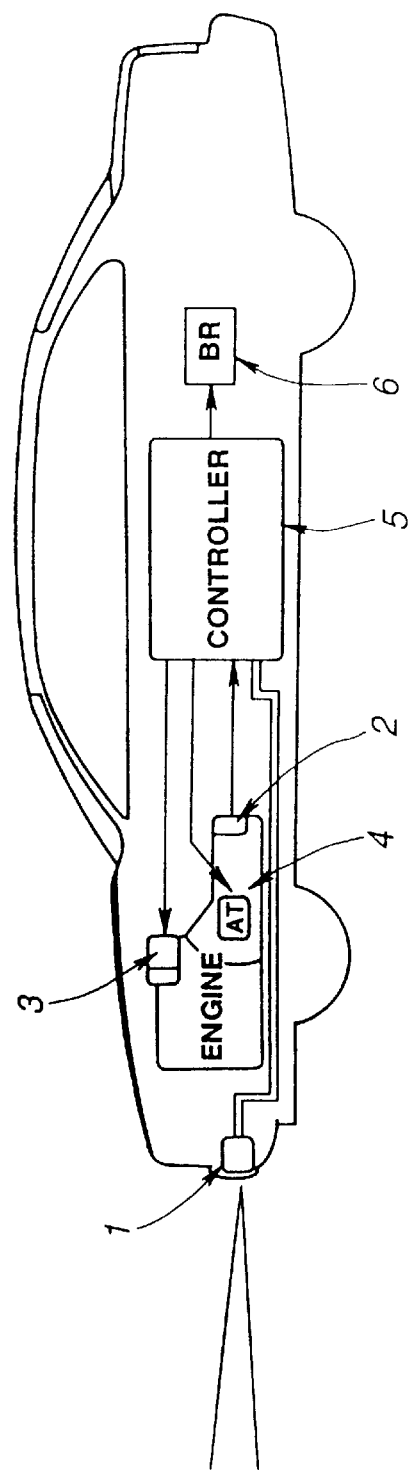
FIG. 1A is a block diagram of an automatic vehicular velocity control apparatus for an automotive vehicle in a first preferred embodiment according to the present invention.

FIG. 1A shows a whole configuration of an automatic vehicular velocity control apparatus in a first preferred embodiment according to the present invention applicable to an automotive vehicle.

In FIG. 1A, an inter-vehicle distance sensor 1 is disposed on a front lower portion of the vehicle to detect an inter-vehicle distance from the vehicle to a preceding vehicle which is running ahead of the vehicle on the same traffic lane as the vehicle.

The inter-vehicle distance sensor 1 is constituted by, for example, a radar unit which emits a laser light beam toward a front detectable zone and receives a reflected light beam from an object present in the front detectable zone.

The inter-vehicle distance L to the preceding vehicle and a relative velocity $\Delta V$ of the vehicle to the preceding vehicle are detected.

The relative velocity $\Delta V$ is derived by differentiating the detected value L of the inter-vehicle distance or may be derived by passing the detected value L of the inter-vehicle distance through a band pass filter (BPF).

It is noted that the inter-vehicle distance may be detected using an electromagnetic wave or an ultrasonic wave and the relative velocity may be calculated from the detected result through such a medium as the electromagnetic wave or the ultrasonic wave.

A vehicular velocity sensor 2 detects a revolution velocity of an output axle of a transmission 4 to be converted to a vehicular velocity V.

Figure 1B:
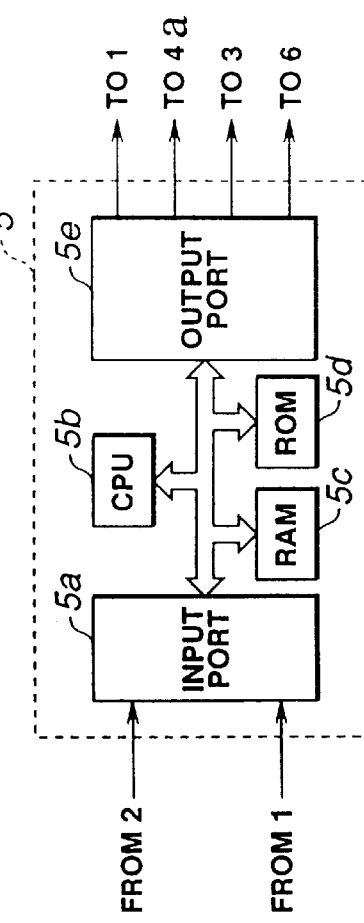
FIG. 1B is a circuit block diagram of a controller shown in FIG. 1A.

A controller 5 (also called, a preceding vehicle follow-up run controller) includes a microcomputer and its peripheral devices. The microcomputer includes, as shown in FIG. 1B, a CPU (Central Processing Unit and specifically a MPU (microprocessor unit)), a RAM (Random Access Memory), a ROM (Read Only Memory), an Input Port, an Output Port, and a common bus.

The controller 5 calculates a vehicular velocity command value V* such that both of the inter-vehicle distance L and the relative velocity $\Delta V$ give their optimum values on the basis of the inter-vehicle distance L, the relative velocity $\Delta V$, and the vehicular velocity V when the vehicle follows up the preceding vehicle. The details of the controller 5 will be described later.

A vehicular velocity control section 4(5) calculates a plurality of command values of a command values of a command values of a command value to command an engine throttle valve actuator 30 to open an engine throttle value 3, a command value to command an automatic 60 to generate a braking liquid pressure in a brake system 6 according to its command value, and a command value to command a gear ratio actuator 40 to adjust the gear ratio of the transmission 4a according to its command value.

The throttle valve actuator 30 adjustably derives the opening angle of the engine throttle valve 3 according to the command value of the engine throttle valve 3.

For example, a Japanese Patent Application First Publication No. Heisei 10-272963 published on Oct. 13, 1998 exemplifies the robust model matching technique applied to the vehicular velocity control section 4(5).

The automatic brake actuator 60 adjusts the braking liquid pressure of the brake system 6 according to its command value. The transmission gear ratio actuator 40 adjusts the gear ratio of the transmission 4a. Although the transmission 4a is an automatic transmission in the first embodiment, the transmission 4a may be continuously variable transmission (CVT). In the case of the continuously vairable transmission, the gear ratio means a speed ratio.

Figure 2:
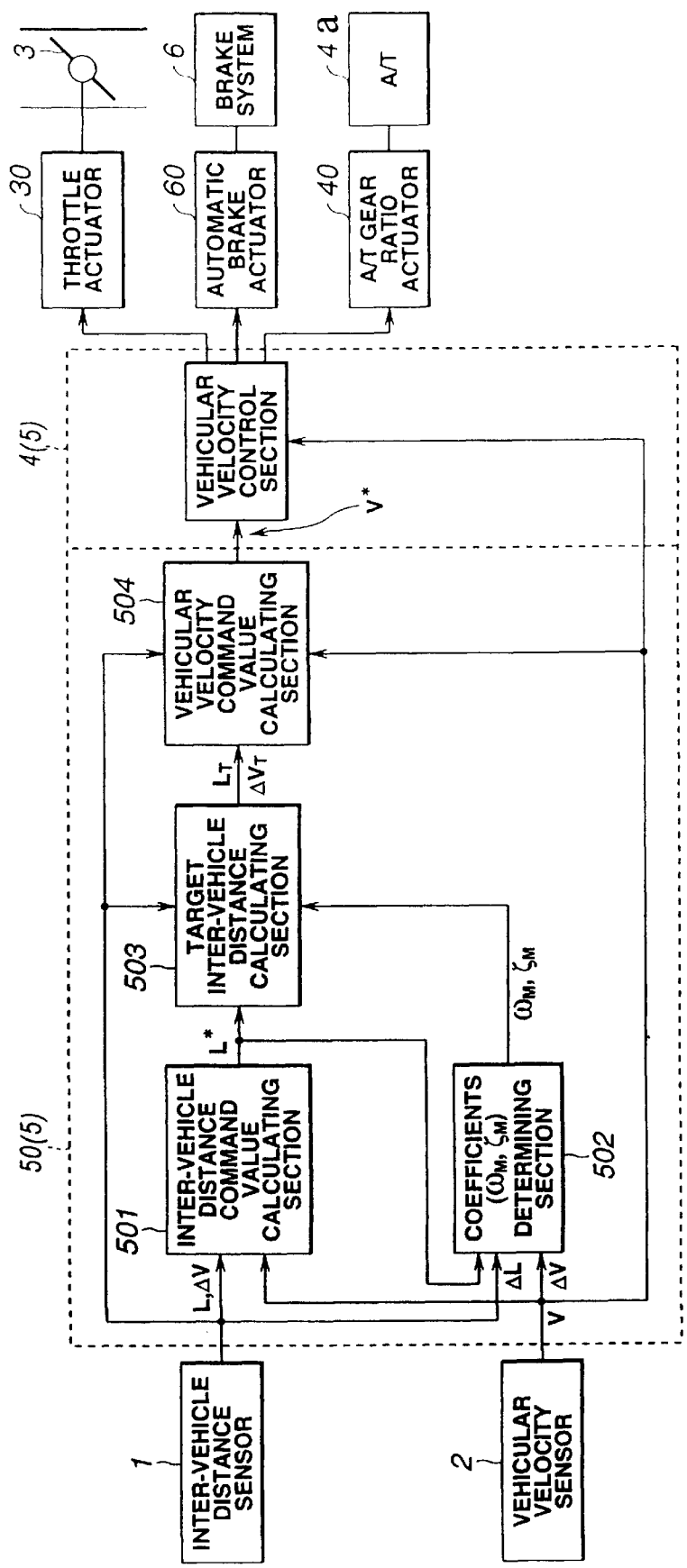
FIG. 2 is a functional block diagram of the automatic vehicular velocity control apparatus shown in FIG. 1A.

In the first embodiment shown in FIGS. 1A, 1B, and 2, a transfer funstion Gv(s) of a vehicular velocity control system to which the vehicular command value V* from the preceding vehicle follow-up run control system 50(5) of the controller 5 is inputted and from which the vehicular velocity V detected by means of the vehicular velocity sensor 2 is outputted is approximated to such a first-order lag system as expressed in an equation (1) of TABLE 3.

In the equation (1), $\omega v$ denotes a break point angular frequency of the transfer function of the vehicular velocity control system ($\omega V = 1/T$, T denotes a time constant).

As shown in FIG. 2, the preceding vehicle follow-up rum controller 50(5) functionally includes, in terms of a software configuration of the microcomputer, an inter-vehicle distance command value calculating section 501, a coefficients determining section 502, a target inter-vehicle distance calculating section 503, and a vehicular command value calculating section 504.

It is noted that in a case where the preceding vehicle is not in the front detectable zone of the inter-vehicle distance sensor 1, the preceding vehicle follow-up run control system 50(5) outputs a vehicular velocity set by a vehicular occupant (a set vehicular velocity) to the vehicular control section 4 as the vehicular velocity command value V* so that the vehicle runs constantly at the set vehicular velocity (cruise run).

The preceding vehicle follow-up run control system 50 receives the inter-vehicle distance L and the relative velocity $\Delta V$ from the inter-vehicle distance sensor 1 and the vehicular velocity V from the vehicular velocity sensor 2.

On the other hand, if the inter-vehicle distance sensor 1 recognizes the presence of the preceding vehicle in the front detectable zone, the inter-vehicle distance command value calculating section 501 calculates the inter-vehicle distance command value L* on the basis of the vehicular velocity V and the relative velocity $\Delta V$.

The vehicular velocity $V_T$ of the preceding vehicle is expressed as follows:

$$V_T = V + \Delta V \qquad (2).$$

The command value L* of the inter-vehicle distance is calculated as the function of the vehicular velocity of the preceding vehicle.

That is to say,
$$L^* = a \cdot V_T + Lof \quad (3)$$
$$= a \cdot (V + \Delta V) + Lof.$$

In the equation (3), a denotes a coefficient and Lof denotes an offset.

Alternatively, the command value L* of the inter-vehicle distance may be calculated as a function of the vehicular velocity V.

$$L^* = a' \cdot V + Lof' \quad (4).$$

In the equation (4), a' denotes another coefficient and Lof' denotes another offset.

Furthermore, the set vehicular velocity by the vehicular occupant(s) may be used as the command value of the inter-vehicle distance L*.

The coefficients determining section 502 determines the damping factor $\zeta M$ and the specific angular frequency $\omega M$ in the inter-vehicle distance control system according to the inter-vehicle distance deviation $\Delta L$ and the relative velocity $\Delta V$ in order to provide an optimum response characteristic according to the inter-vehicle distance deviation $\Delta L$ and the relative velocity $\Delta V$ for the response characteristic of the inter-vehicle distance control system until the actual inter-vehicle distance L has reached to the command value L* of the inter-vehicle distance in the inter-vehicle distance control system from which the inter-vehicle distance command value L* from the inter-vehicle distance command value calculating section 301 is inputted and from which the actual inter-vehicle distance detected by means of the inter-vehicle distance sensor 1 is outputted.

It is noted that the inter-vehicle distance deviation $\Delta L$ is expressed as $$\Delta L = L - L^* \quad (5).$$

Specifically, numerical values of the damping factor $\zeta M$ and the specific angular frequency $\omega_M$ in the inter-vehicle distance control system are previously set (stored) as respective maps in accordance with the inter-vehicle distance deviation $\Delta L$ and the relative velocity $\Delta V$ in order to obtain the optimum response characteristic on the inter-vehicle distance control in various follow-up run situations and determines the damping factor $\zeta M$ and the specific angular frequency $\omega_M$ in the inter-vehicle distance control system are previously stored (set) as respective maps in accordance with the inter-vehicle distance deviation $\Delta L$ and the relative velocity $\Delta V$ in order to obtain the optimum response characteristic on the inter-vehicle distance control system in various follow-up run situations and determines the values of coefficients of the damping factor $\zeta M$ and the specific angular frequency of $\omega_M$ in accordance with the inter-vehicle distance deviation $\Delta L$ and the relative velocity $\Delta V$ for a target inter-vehicle distance calculation.

TABLE 1 shows an example of the map on the damping factor of $\zeta M$ and TABLE 2 shows an example of the other map on the specific angular frequency of $\omega_M$.

The target inter-vehicle distance calculating section 501 calculates a target inter-vehicle distance $L_T$ and a target relative velocity $\Delta V_T$ through a second order filter described in an equation (6) of TABLE 3 using the damping factor $\zeta M$ and the specific angular frequency $\omega_M$ to provide a target response characteristic in the inter-vehicle distance control system for the response characteristic. It is noted that the inter-vehicle distance L0 and the relative velocity V0 immediately after the preceding vehicle has been recognized are set to their initial values.

The target inter-vehicle distance $L_T$ and the target relative velocity $\Delta V_T$ are a final inter-vehicle distance command value prescribing a time transition of the inter-vehicle distance and the relative velocity so that the actual inter-vehicle distance exhibits the target response characteristic and is converged into the inter-vehicle distance command value L*.

If the equation (6) is evolved and a Laplace transform is carried out for the evolved equation (6), an equation (7) of TABLE 3 can be given.

The equation (7) represents a transfer function of the target inter-vehicle distance $L_T$ to the inter-vehicle distance command value L* and is expressed in the second-order form.

In the first embodiment, a feedback control is carried out in the inter-vehicle distance control system so that the actual inter-vehicle distance L provides the target inter-vehicle distance $L_T$ (final inter-vehicle distance command value) represented by the equation (7).

As described above, since the values such that the target inter-vehicle distance control response can be obtained in accordance with the inter-vehicle distance deviation $\Delta L$ and the relative velocity $\Delta V$ are set for the damping factor CM and the specific angular frequency $\omega M$ in the inter-vehicle distance control system, a desirable inter-vehicle distance control response can be achieved under various follow-up run situations.

Such a response characteristic that the actual inter-vehicle distance is slowly converged into the command value without abrupt deceleration of the vehicle is desirable as the target inter-vehicle control response characteristic is a case where the relative velocity to the preceding vehicle is low (small) even with the inter-vehicle distance to the preceding vehicle being shorter than the command value thereof when another vehicle (a new preceding vehicle) is interrupted into a spatial interval between the preceding vehicle (the old preceding vehicle) and the vehicle or when the vehicle has made a traffic lane change to an overtake traffic lane on which the overtake vehicle is present as the new preceding vehicle.

In addition, such a response characteristic that the actual inter-vehicle distance is slowly converged to the command value thereof without the abrupt deceleration in a case where the relative velocity is large (high) with the inter-vehicle distance being long when the vehicle is approaching to the new preceding vehicle.

In such the follow-up run control situations as described above, the actual inter-vehicle distance overshoots or undershoots around the command value thereof and converges to the command value thereof to exhibit the second-order response characteristic. Such the second-order response characteristic can be achieved through the second-order filter shown in the equations (6) and (7).

The vehicular velocity command value calculating section 504 calculates the command value L* of the vehicular velocity using predetermined (gain) constants fv and $f_L$ in accordance with the following equation (8).

$$V^* = \{V(t) + \Delta V(t)\} - [fv\{\Delta V_T(t) - \Delta V(t)\} + f_L\{L_T(t) - L(t)\}] \quad (8).$$

In the equation (8), fv denotes a first gain constant by which a target relative velocity deviation (a difference from a target relative velocity $\Delta V_T(t)$ to a detected value of the relative velocity $\Delta V(t)$) is multiplied and $f_L$ denotes a second gain constant by which a target inter-vehicle distance deviation (a difference from a target inter-vehicle distance $L_T(t)$ to the detected value L(t) of the inter-vehicle distance) $\{L_T(t) - L(t)\}$ is multiplied.

The vehicular velocity control section 4 adjusts at least one or each of the throttle valve actuator 30, the automatic brake actuator 10, and A/T gear ratio actuator 40 to make the actual vehicular velocity V(t) equal to the command value V* of the vehicular velocity.

(Second Embodiment)

In the first embodiment, the feedback control is exemplified to make the actual inter-vehicle distance L equal to the target inter-vehicle distance $L_T$ indicating the target response characteristic of the inter-vehicle distance. However, in this inter-vehicle distance feedback control system, a control gain in the inter-vehicle distance control system needs to be increased with a control time constant thereof being shortened in order to increase the response characteristic. At this time, a control stability is sacrificed and there is a trade-off relationship between the response characteristic (speed of response) and the stability of control.

In a second preferred embodiment, a feed-forward loop is added to the inter-vehicle distance feedback control system in the first embodiment to derive a compensated vehicular velocity command value Vc to achieve the target inter-vehicle distance response from the command value L* of the inter-vehicle distance. This compensated vehicular velocity command value Vc corrects the vehicular velocity command value V* derived in the inter-vehicle distance control system according to the command value Vc of the compensated vehicular velocity. Consequently, the control response characteristic can be improved without sacrifice of the stability in the inter-vehicle distance control.

Figure 3:
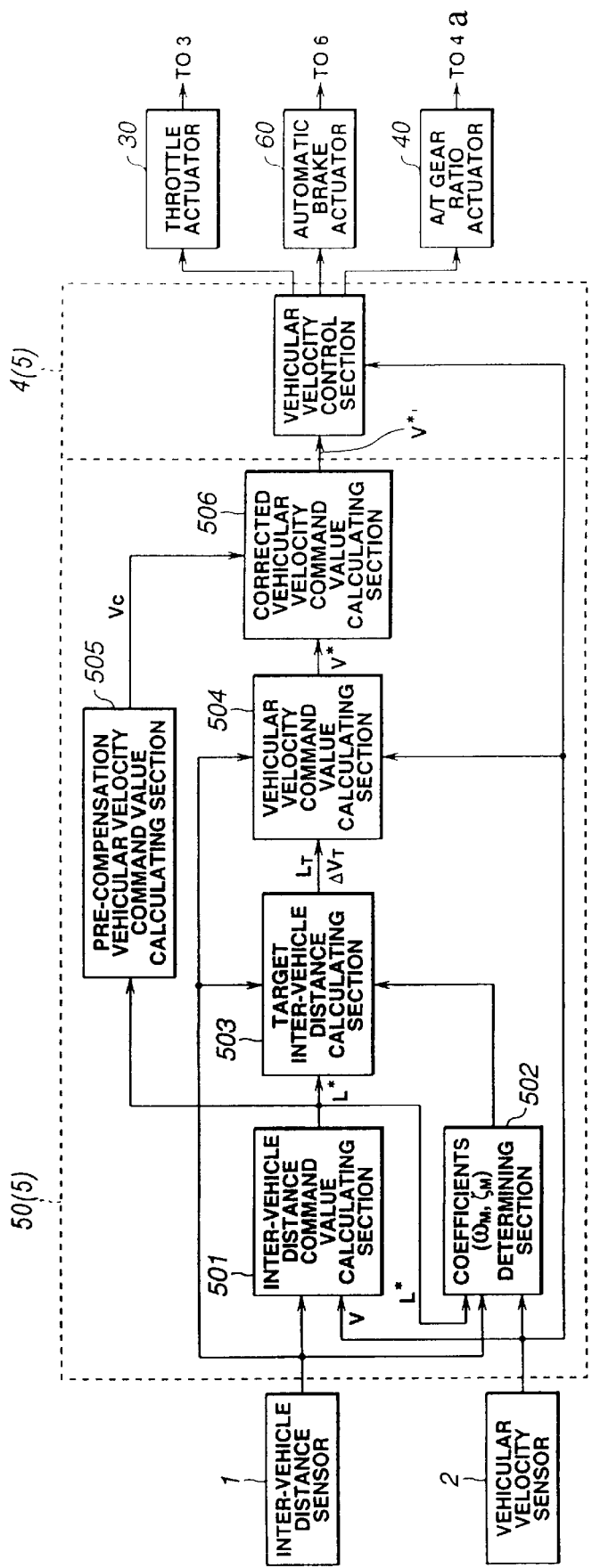
FIG. 3 is a functional block diagram of the automatic vehicular velocity control apparatus in a second preferred embodiment according to the present invention.

FIG. 3 shows the functional block diagram of the controller 5 in the second embodiment.

The preceding vehicle follow-up run controller 50(5) includes a pre-compensation vehicular velocity command value calculating section 505 connected to the input end of the target inter-vehicle distance calculating section 503 and a corrected vehicular velocity command value calculating section 506 in addition to the inter-vehicle distance command value calculating section 501, the coefficients determining section 502, the target inter-vehicle distance calculating section 503, and the vehicular command value calculating section 504.

The pre-compensation vehicular velocity command value calculating section 505 calculates the compensated vehicular velocity command value Vc from the command value L* of the inter-vehicle distance through a filter expressed in an equation (9) of TABLE 3.

Figure 4:
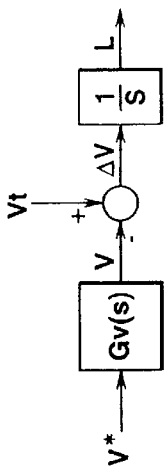
FIG. 4 is a functional block diagram of a vehicular velocity control system in the automatic vehicular velocity control apparatus applicable to each embodiment.

The filter in the equation (9) is represented by a product between an inverse of the transfer function from the vehicular velocity command value V* to the actual inter-vehicle distance L and the control response characteristic of the target inter-vehicle distance shown in the equation (7). It is noted that the transfer function from the vehicular velocity command value V* to the actual inter-vehicle distance L is represented by a product between the transfer function of the vehicular velocity control system having the input of the vehicular velocity command value V* and the output of the actual vehicular velocity V (the equation (1)) and a deviation between the actual vehicular velocity V and the vehicular velocity $V_T$ of the preceding vehicle, i.e., an integrator to integrate the relative velocity ΔV to derive the actual inter-vehicle distance L, as shown in FIG. 4.

Initial values when calculating the compensated vehicular velocity command value Vc corresponding to the equation (9) of TABLE 3 are the inter-vehicle distance L0 and the relative velocity ΔV0 which are derived immediately after the inter-vehicle distance sensor 1 has just been recognized the presence of the preceding vehicle.

$$V^{*\prime}=V^*+Vc \tag{10}$$

Then, the vehicular velocity control section 4 controls at least one or each of the throttle valve actuator 30, the automatic brake actuator 60, and the A/T gear ratio actuator 40 to make the actual vehicular velocity V equal to the vehicular velocity command value $V^{*\prime}$.

FIGS. 5A through 10C show the results of simulations.

It is noted that since the results of simulations in the first embodiment indicate the same results of simulations in the second embodiment (as will be described later), the explanations of the case of the first embodiment will be omitted herein.

Figure 11:
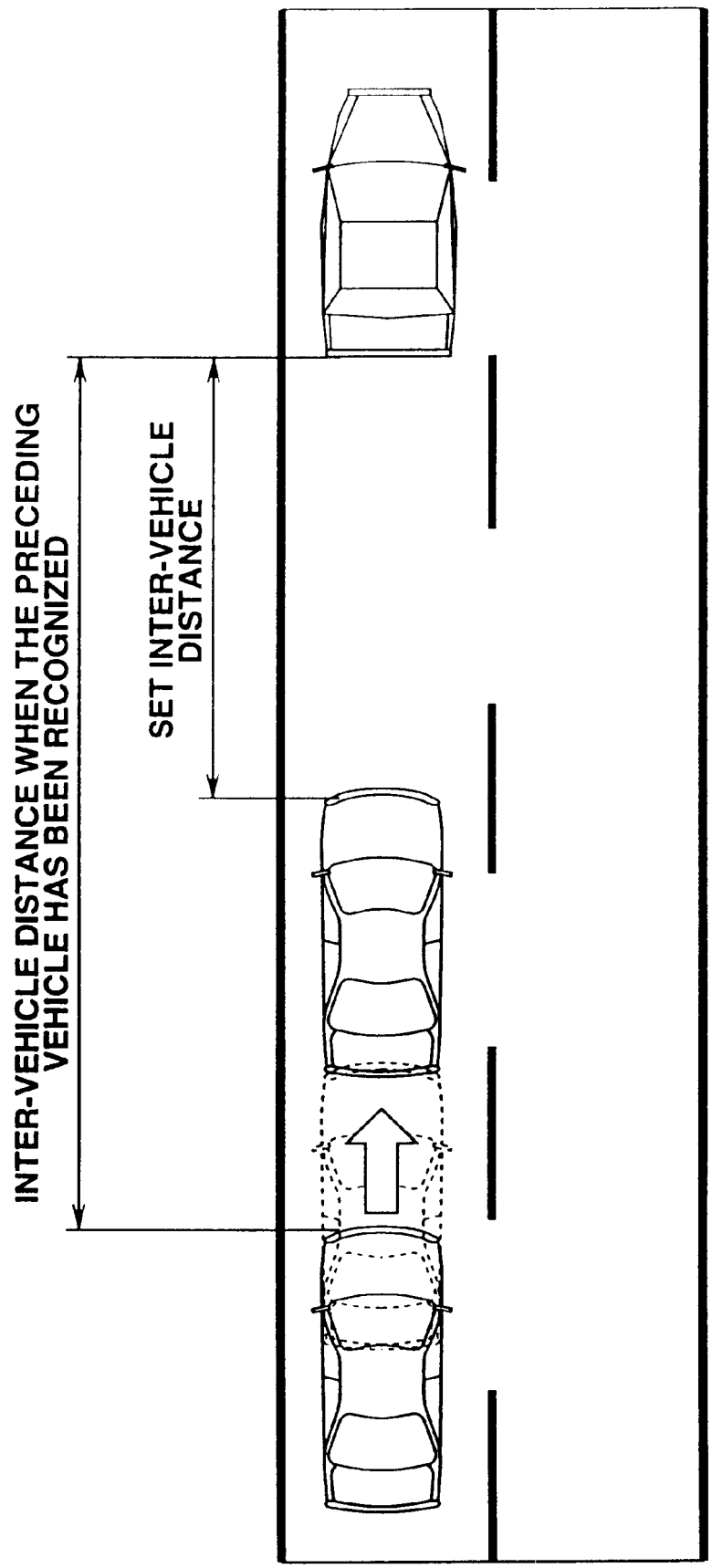
FIG. 11 is an explanatory view for explaining one of the various follow-up run situations in which the vehicle is approaching to the preceding vehicle.

FIGS. 5A, 5B, and 5C show timing charts indicating the inter-vehicle distance, the relative velocity, and the acceleration (a signed acceleration, namely, a variation rate of the vehicular velocity) when a comparative example of the automatic vehicular velocity control apparatus in each of the first and second embodiments is operated in a case where the vehicle has recognized the presence of the preceding vehicle and thereafter approached to the preceding vehicle up to the set (target) inter-vehicle distance as shown in FIG. 11.

Figure 6A:
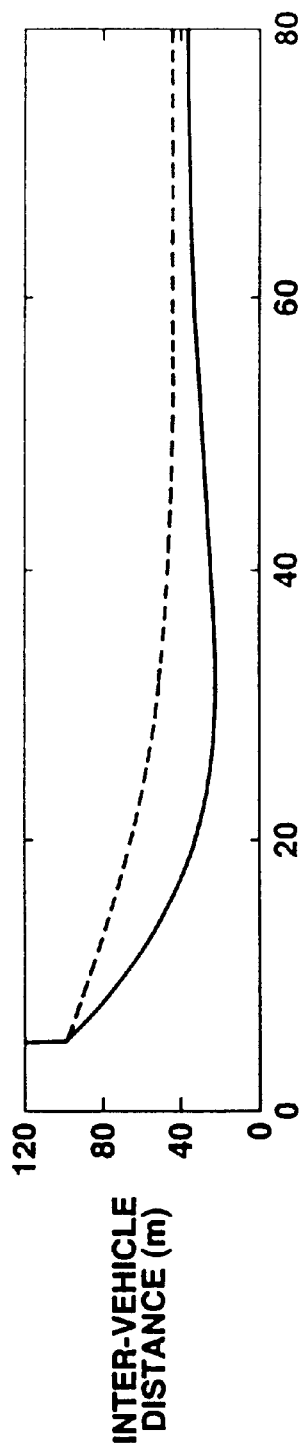
FIGS. 6A, 6B, and 6C are simulation results in the inter-vehicle distance, the relative velocity, the acceleration of the automatic vehicular velocity control apparatus in each of the first and second embodiments when the vehicle is approaching to the preceding vehicle in the same situation as shown in FIG. 11.
Figure 6B:
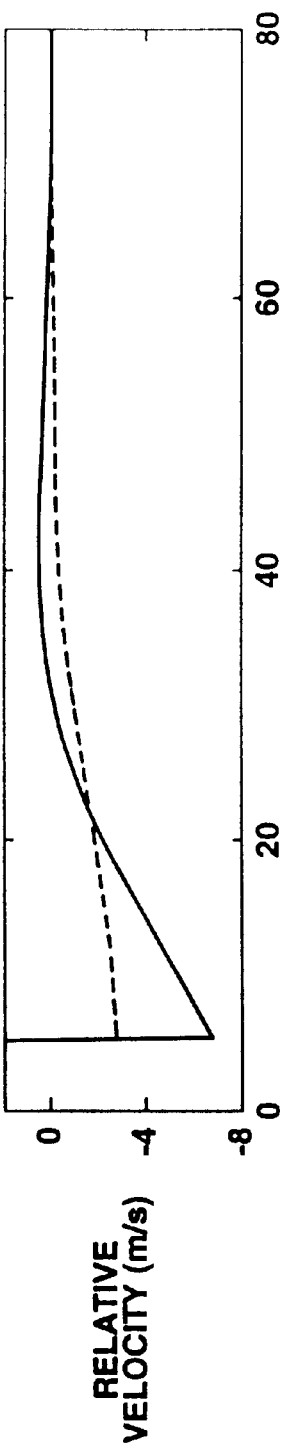
Figure 6C:
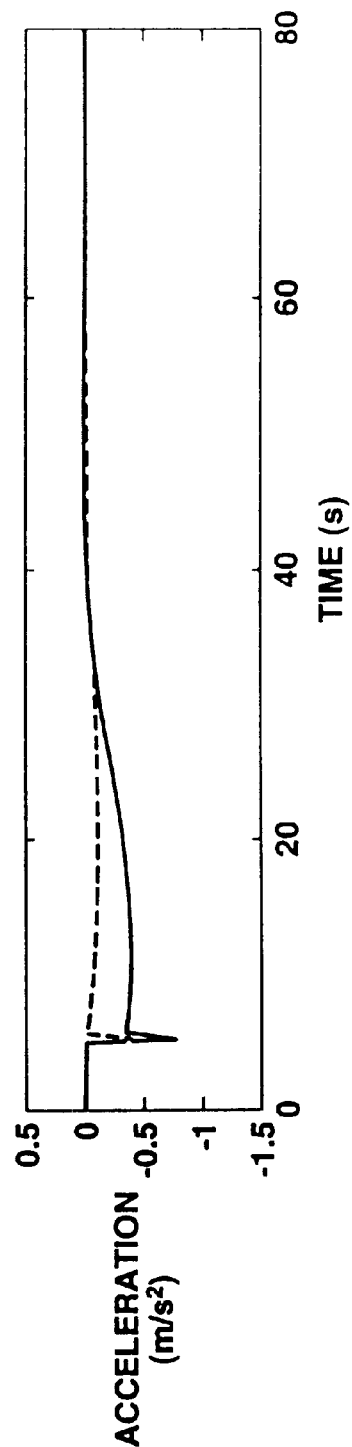

FIGS. 6A, 6B, and 6C show timing charts indicating the inter-vehicle distance, the relative velocity, and the acceleration when the automatic vehicular velocity control apparatus in the second embodiment is operated in the same case shown in FIG. 11.

In each of FIGS. 5A through 6C, each solid line denotes a case of the vehicular velocity of 100 Km/h, the initial value of the inter-vehicle distance of 100 m, and the vehicular velocity of the preceding vehicle of 75 Km/h, the initial value of the inter-vehicle distance of 100 m, and the vehicular velocity of the preceding vehicle of 90 Km/h.

Since, in the comparative example, in a case where the relative velocity of the vehicle to the preceding vehicle is large, the abrupt deceleration is carried out immediately after the preceding vehicle has been recognized as shown in the solid line even when the inter-vehicle distance is long, a negatively large acceleration (deceleration) occurs in the vehicle so that the vehicular run disagreeable to the vehicular occupant occurs.

However, since, in the second embodiment, when the actual inter-vehicle distance is longer than the command value thereof and the inter-vehicle distance deviation is large although the relative velocity value to the preceding vehicle is large, such the damping factor and the specific angular frequency as to provide the inter-vehicle distance control response which is slowly converged to the command value of the inter-vehicle distance can be provided by the previously set maps thereon, the vehicle tends to be too approached to the preceding vehicle to some degree but a degree of decrease in the relative velocity becomes moderate. However, the large deceleration is not generated but a smooth start to follow up the preceding vehicle can be achieved without giving the vehicular run disagreeable to the vehicular occupant(s). It is noted that in a case where the relative velocity to the preceding vehicle is reduced, the similar simulation results as the comparative example are obtained.

Figure 12:
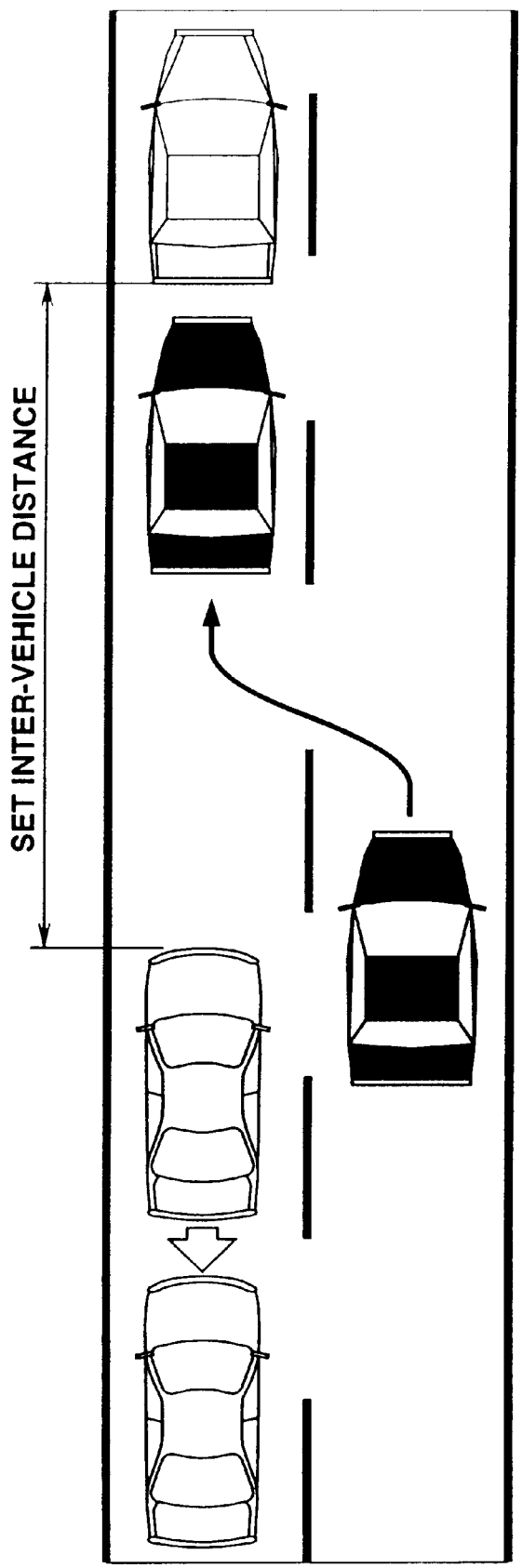
FIG. 12 is an explanatory view for explaining one of the various follow-up run situations in which the other vehicle is interrupted into the traffic lane on which the vehicle is running.

FIGS. 7A, 7B, and 7C show timing charts of the inter-vehicle distance, the relative velocity, and the acceleration of the comparative example as the results of simulations when the other vehicle which has running at a different traffic lane is interrupted into the traffic lane before the vehicle as the new preceding vehicle as shown in FIG. 12.

FIGS. 8A, 8B, and 8C show timing charts of the inter-vehicle distance, the relative velocity, and the acceleration of the automatic vehicular velocity control apparatus in the second embodiment as the results of simulations in the same situation as shown in FIG. 12.

It is noted that the vehicular velocities of the vehicle and of the preceding vehicle were 90 Km/h and the vehicular velocity of the interrupted new preceding vehicle was 30 m. Each solid line in FIGS. 7A, 7B, and 7C denotes the actual response and each broken line therein denotes the target response.

In the comparative example, when the inter-vehicle distance between the vehicle and the interrupt new preceding vehicle became abruptly short, the abrupt deceleration of the vehicle was carried out immediately after the vehicular interruption occurred, and the large deceleration of the vehicle was developed even if the relative velocity value to the interrupt new preceding vehicle was small so that the vehicular run disagreeable to the vehicular occupant occurred.

In the second embodiment, however, since such the damping factor and the specific angular frequency as to provide the control response of the inter-vehicle distance which is slowly converged into the command value of the inter-vehicle distance by the previously set maps, the vehicle tends to be approached to the new preceding vehicle to some degree but the degree of decrease in the relative velocity became moderate. In addition, no large deceleration occurs and the smooth start to follow up the interrupt new preceding vehicle can be achieved without giving the disagreeable vehicular run to the vehicular occupant(s).

Figure 13:
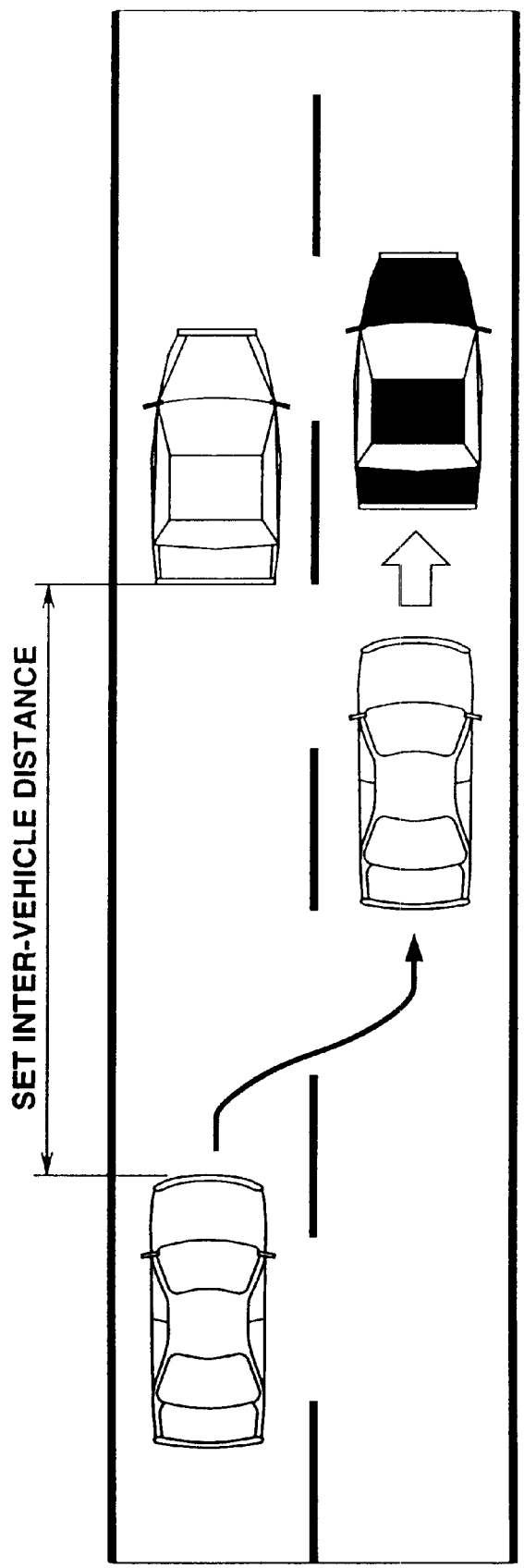
FIG. 13 is an explanatory view for explaining one of the various follow-up run situations in which the vehicle has made the traffic lane change to the overtake traffic lane to follow up the overtake vehicle.

FIGS. 9A, 9B, and 9C show timing charts representing the inter-vehicle distance, the relative velocity, and the acceleration of the case of the comparative example as the results of simulations when the vehicle has made the traffic lane change after the overtake vehicle as the new preceding vehicle to the adjacent overtaking traffic lane to overtake the preceding vehicle (old preceding vehicle) as shown in FIG. 13.

FIGS. 10A, 10B, and 10C show timing charts representing the inter-vehicle distance, the relative velocity, and the acceleration of the automatic vehicular velocity control apparatus in the second embodiment as the results of simulations in the same situation as shown in FIG. 13.

It is noted that the vehicular velocity of the vehicle and the vehicular velocity of the preceding vehicle were $_{75}$ Km/h, the vehicular velocity of the new preceding vehicle which is running at the overtake traffic lane was 90 Km/h, and the inter-vehicle distance from the vehicle to the preceding vehicle immediately after the vehicle has entered the overtake traffic lane was 20 m.

In the comparative example, when the vehicle has made the traffic lane change to the adjacent lane before the overtaking vehicle and the inter-vehicle distance to the overtaking vehicle as the new preceding vehicle becomes abruptly short, the abrupt deceleration of the vehicle was carried out even if the relative velocity to the overtake vehicle is small (low). Then, the large deceleration of the vehicle occurs so as to give the vehicular occupant(s) the disagreeable vehicular run.

However, in the second embodiment, since in a case where the actual relative velocity is small even when the actual inter-vehicle distance is shorter than the command value of the inter-vehicle distance and the deviation of the inter-vehicle distance indicates negative, such the damping factor and the specific angular frequency as to provide the control response characteristic as to be slowly converged into the command value of the inter-vehicle distance by means of the retrieved previously set map data, the vehicle tended to be approached to the new preceding vehicle but the degree of decrease in the relative velocity became moderate. Then, no large deceleration occurred and the smooth start to follow up the (new) preceding vehicle can be achieved without giving the disagreeable vehicular run to the vehicular occupant(s).

As described hereinabove, in each of the first and second embodiments, the damping factor and the specific angular frequency in the inter-vehicle distance control system are previously stored as the maps (TABLE 1 and TABLE 2) in accordance with the inter-vehicle distance deviation and the relative velocity so as to provide the optimum inter-vehicle distance control in various follow-up run situations as shown in FIGS. 11 through 13. Then, the command value of the vehicular velocity based on the target inter-vehicle distance and the target relative velocity is calculated and the driving force, the braking force, and/or the gear ratio of the transmission 4 is controlled in accordance with the command value of the vehicular velocity. Hence, in various follow-up run situations, the optimum inter-vehicle distance control response can be achieved and the smooth follow-up run to the preceding vehicle can be started without the abrupt deceleration.

In addition, in the second embodiment, the response characteristic can be improved without sacrifice of the stability in the inter-vehicle distance control system.

In the second embodiment, the follow-up run control according to the present invention is applicable to the various follow-up run situations shown in FIGS. 11, 12, and 13.

However, the follow-up run control according to the present invention is applicable to the other situations than those shown in FIGS. 11 to 13.

It is noted that the hardware structure of the second embodiment is the same as in the first embodiment shown in FIGS. 1A and 1B.

(Third Embodiment)

In each of the first and second preferred embodiments, the damping factor $\zeta_M$ and $\omega_M$ to determine the response characteristic of the target inter-vehicle distance $L_T$ are set in accordance with the inter-vehicle distance deviation (L–L*) and the relative velocity $\Delta V$. In a third embodiment of the automatic vehicular velocity control apparatus according to the present invention, the predetermined constants fv and fL (refer to the equation (8) described above) in the inter-vehicle distance feedback control system are set in accordance with the relative velocity $\Delta V(t)$ to make the actual inter-vehicle distance L(t) equal to the target inter-vehicle distance $L_T(t)$. Then, the response characteristic in the inter-vehicle distance control system can be improved.

It is noted that the constants fv and fL in the inter-vehicle distance feedback control system are called gains, the gain fL by which the difference between the target inter-vehicle distance $L_T(t)$ and the actual inter-vehicle distance L(t), namely, the target inter-vehicle distance deviation $\{L_T(t)–L(t)\}$ is multiplied is called the first gain and the gain fv by which the difference between the target relative velocity $\Delta V(t)$ and the actual relative velocity $\Delta V(t)$, namely, the target relative velocity deviation $\{\Delta V_T(t)–\Delta V(t)\}$ is multiplied is called the second gain.

In the situation wherein the vehicle follow-up the preceding vehicle whose relative velocity value to the vehicle is small (low) as shown in FIGS. 12 and 13, the vehicle is decelerated with the large degree of deceleration, increasing a follow-up capability of the actual inter-vehicle distance L(t) to the target inter-vehicle distance $L_T(t)$.

At this time, the vehicular run disagreeable to the vehicular occupant(s) is given. It is, however in this case, desirable to widen the inter-vehicle distance but to slowly decrease the vehicular velocity. To achieve this, it is necessary to reduce the first gain fL by which the target inter-vehicle distance deviation in the inter-vehicle distance feedback control system $\{L_T(t)-L(t)\}$ is multiplied and to increase the second gain fv by which the target relative velocity deviation $\{\Delta V_T(t)-\Delta V(t)\}$ is multiplied. Hence, the response characteristic of the inter-vehicle distance feedback control system becomes slow.

On the other hand, in such a follow-up run situation as to follow up the preceding vehicle whose relative velocity $\Delta V(t)$ is large (this means that the velocity of the preceding vehicle is lower than that of the vehicle), it is desirable for the vehicle to reach to the target inter-vehicle distance $L_T(t)$ from the present actual inter-vehicle distance L(t) as quickly as possible as shown in FIG. 11. Hence, in such a situation as described above, the first gain fL by which the target inter-vehicle deviation $\{L_T(t)-L(t)\}$ in the inter-vehicle distance feedback control system is multiplied is increased but the second gain fv by which the target relative velocity deviation $\{\Delta V_T(t)-\Delta V(t)\}$ is multiplied is reduced.

With the response characteristic in the inter-vehicle distance feedback control system increased, thus, the follow-up characteristic of the actual inter-vehicle distance L(t) to the target inter-vehicle distance $L_T(t)$ is required to be increased.

In the third embodiment, the first and second gains fv and fL in the inter-vehicle distance feedback control system are set in accordance with the relative velocity $\Delta V(t)$ of the vehicle to the preceding vehicle $\Delta V(t)$ to achieve the optimum inter-vehicle distance control response to start the smooth follow-up run to the preceding vehicle in spite of the magnitude of the relative velocity $\Delta V(t)$.

Figure 14:
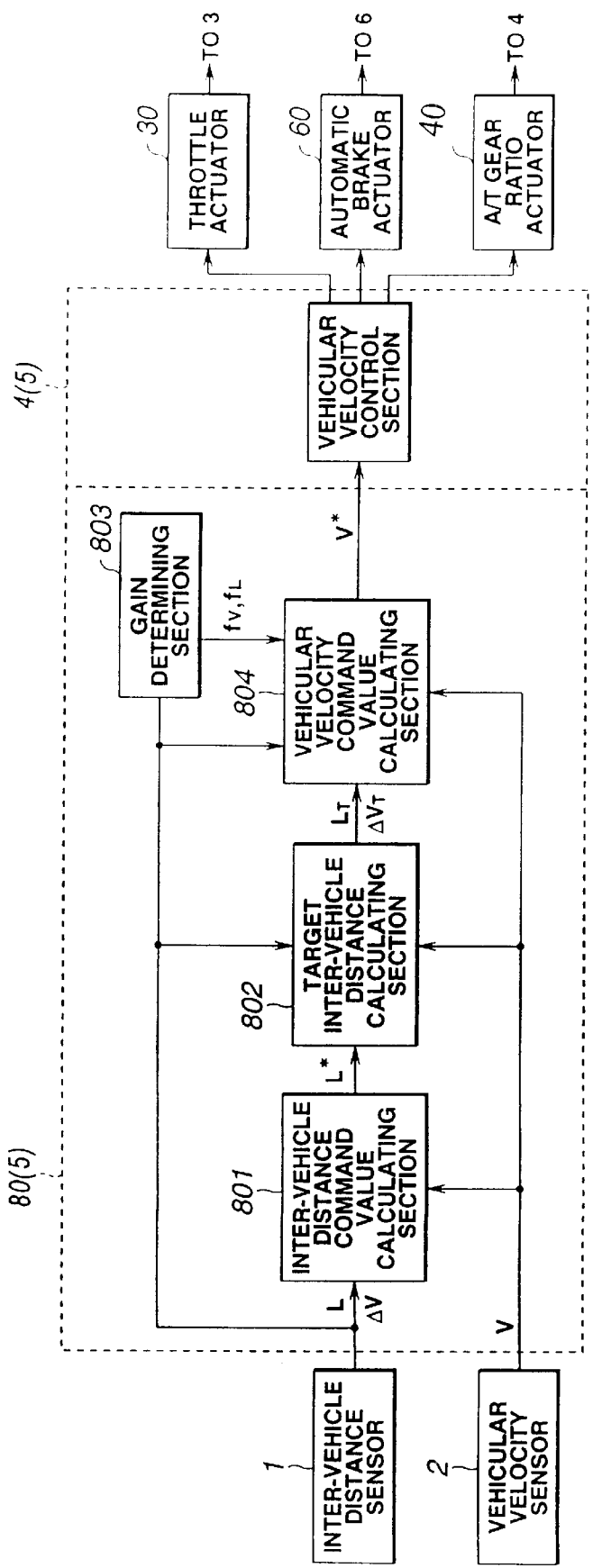
FIG. 14 is a functional block diagram of the automatic vehicular velocity control apparatus in a third preferred embodiment according to the present invention.

FIG. 14 shows the functional block diagram of the automatic vehicular velocity control apparatus in the third embodiment according to the present invention.

The preceding vehicle follow-up run controller 80(5) functionally includes the inter-vehicle distance command value calculating section 801, the target inter-vehicle distance calculating section 802, the gain determining section 803, and the vehicular velocity command value calculating section 804. The preceding vehicle follow-up run controller 5 receives the inter-vehicle distance L and the relative velocity $\Delta V$ from the inter-vehicle distance sensor 1 and the vehicular velocity V from the vehicular velocity sensor 2.

If the preceding vehicle cannot be recognized by means of the inter-vehicle distance sensor 1, the vehicular velocity set as the target vehicle speed is outputted to the vehicular velocity control section 4 as the command value V*(t) of the vehicular velocity.

The inter-vehicle distance command value calculating section 801 calculates the command value of the inter-vehicle distance in the following equation (11) on the basis of the vehicular velocity V(t) and the relative velocity to the preceding vehicle $\Delta V(t)$ if the preceding vehicle is recognized by means of the inter-vehicle distance sensor 1.

$$L^*(t)=a\cdot\{V(t)+\Delta V(t)\}+Lof \quad (11A).$$

$$V(t)+\Delta V(t)=Vt(t) \quad (11B).$$

In the equations (11A) and (11B), Vt(t) denotes the vehicular velocity of the preceding vehicle. It is noted that the command value of the inter-vehicle distance L*(t) may be derived in accordance with the following equation (12) on the basis of only the vehicular velocity V(t) as follows:

$$L^*(t)=a'V(t)+Lof \quad (12).$$

The target inter-vehicle distance calculating section 802 derives the target inter-vehicle distance $L_T(t)$ and the target relative velocity $\Delta V_T(t)$ in accordance with the filter processing of an equation (13) of TABLE 4.

In the equation (13) of TABLE 4, $\omega_M$ and $\zeta_M$ denote the specific angular frequency and the damping factor to determine the response characteristic of the target inter-vehicle distance $L_T(t)$ and the target relative velocity $\Delta V_T(t)$. In either case, a designer sets an arbitrary value therefor.

In the calculation of the equation (13) of TABLE 4, the inter-vehicle distance L0 and the relative velocity $\Delta V0$ immediately after the preceding vehicle has been recognized are initial values.

If the Laplace transform for the evolved equation of (13) is carried out, an equation (14) of TABLE 4 is carried out.

The equation (14) of TABLE 4 is the transfer function from the command value L*(t) of the inter-vehicle distance to the target inter-vehicle distance $L_T(t)$ and is expressed in the second-order equation.

The gain determining section 803 determines the first gain fL by which the target inter-vehicle distance deviation $\{L_T(t)-L(t)\}$ in the inter-vehicle distance feedback control system is multiplied and the second gain fv by which the target relative velocity deviation $\{\Delta V_T(t)-\Delta V(t)\}$ is multiplied according to the relative velocity $\Delta V(t)$.

First, with the relative velocity $\Delta V(t)$ as a parameter, the specific angular frequency $\omega C$ and the damping coefficient $\zeta C$ which are previously stored in the maps are derived. The specific angular frequency $\omega C$ and the damping factor $\omega C$ are the parameters to determine the response characteristic of the inter-vehicle distance feedback control system.

FIG. 14 shows an example of the map representing the specific angular frequency $\omega C$.

Figure 15:
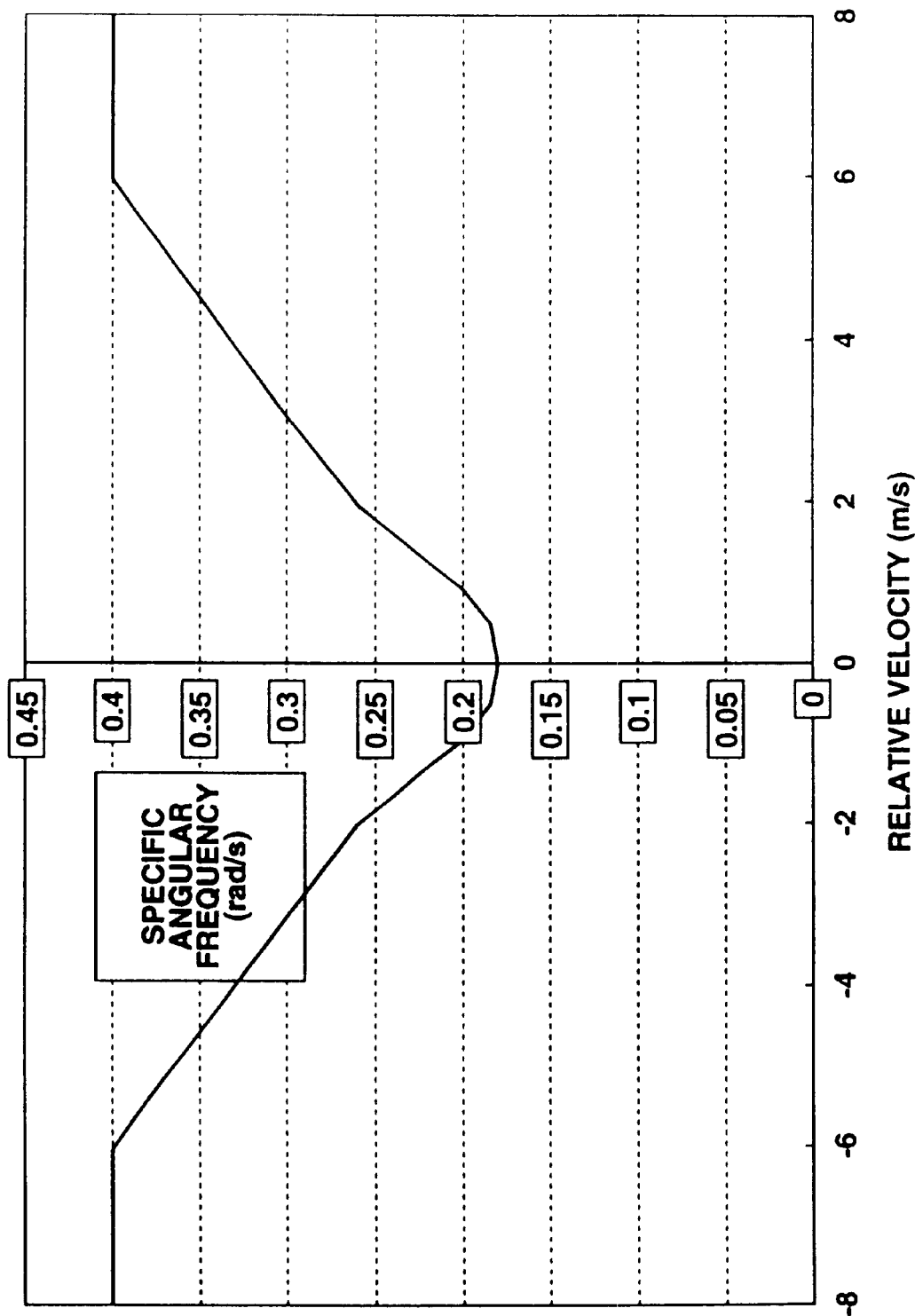
FIG. 15 is an example of a map representing a specific angular frequency $\omega c$ of an inter-vehicle distance control system with respect to a relative velocity in the third embodiment shown in FIG. 14.
Figure 16:
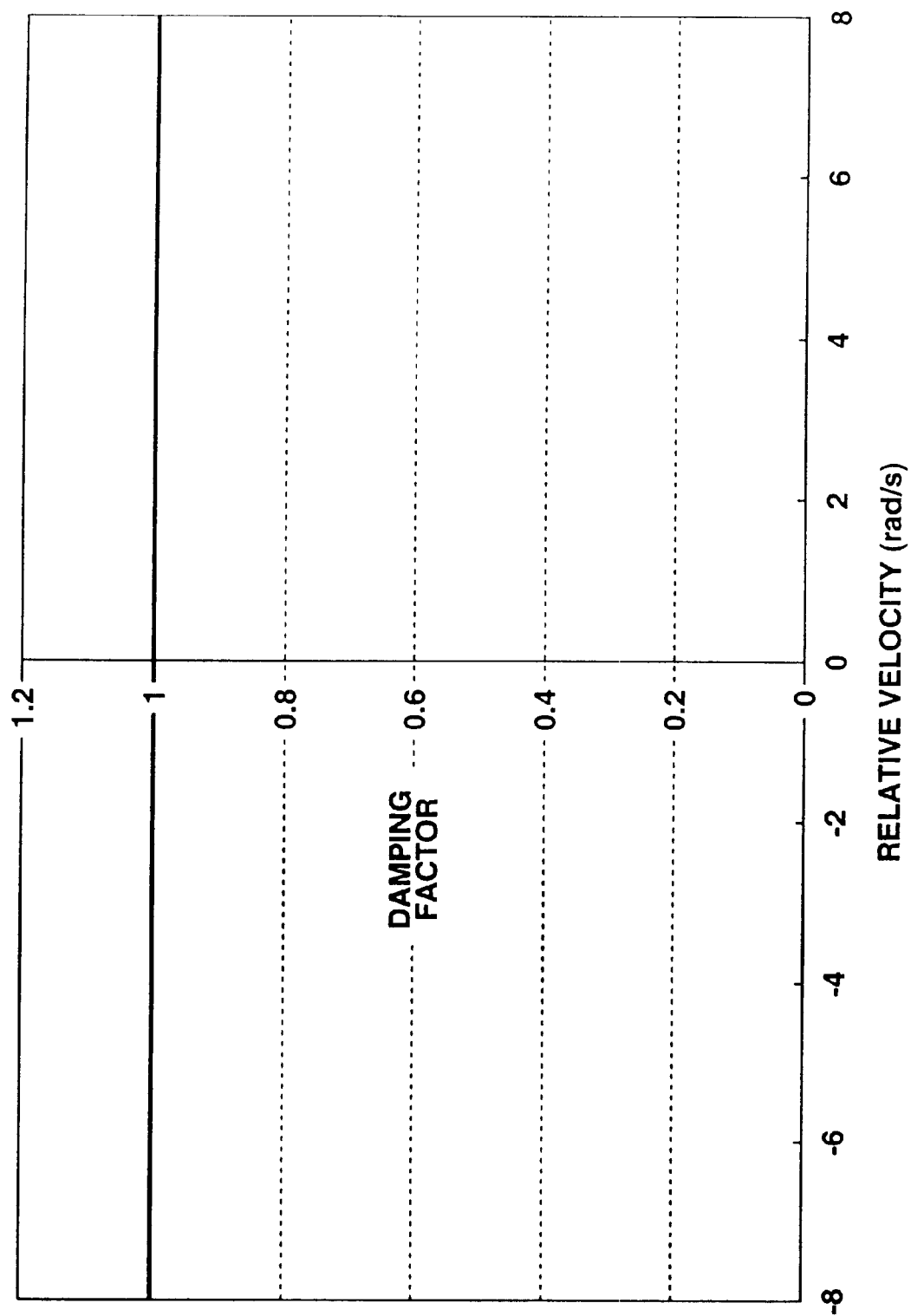
FIG. 16 is an example of a map representing a damping factor $\zeta c$ of the inter-vehicle distance control system with respect to the relative velocity in the third embodiment shown in FIG. 14.

FIG. 15 shows the example of the damping coefficient.

Next, the first gain $f_L$ and the second gain fv to calculate the command value V*(t) of the vehicular velocity are calculated on the basis of the specific angular velocity $\omega C$ and the damping coefficient $\zeta C$ as shown in equations (15A) and (15B).

$$fL=\omega C^2/\omega nV \quad (15A) \text{ and}$$

$$fv=1-2\zeta c\omega c/\omega nV \quad (15B)$$

In the equation (15A), $\omega nV$ denotes the specific angular frequency in the inter-vehicle distance control system so as to make the detected value of the vehicular velocity (actual vehicular velocity) V(t) equal to the command value V*(t) of the vehicular velocity. The first gain fL is proportional to a square $\omega C$ of the specific angular frequency in the inter-vehicle distance feedback control system and the second gain fv is proportional to the specific angular frequency $\omega C$. Hence, when the relative velocity $\Delta V(t)$ is varied, the first gain fL is largely varied than the second gain fv.

The vehicular velocity command value calculating section 804 calculates the command value V*(t) of the vehicular velocity to make the relative velocity $\Delta V(t)$ equal to the target relative velocity $V_T(t)$ and simultaneously to make the inter-vehicle distance L(t) equal to the target inter-vehicle distance $L_T(t)$.

That is to say, the first gain fL and the second gain fv determined by the gain determining section 803 according to the relative velocity $\Delta V(t)$ are used to calculate the command value of the vehicular velocity in accordance with an equation (16).

$$V^*(t)=\{V(t)+\Delta V(t)\}-\{fv\{\Delta V_T(t)-\Delta(t)\}+f_L\}L_T(t)-L(t)\} \quad (16)$$

The vehicular velocity control section 4 is the same as that described in each previous embodiment, namely, adjustably controls at least one or each of the throttle actuator 30, the automatic actuator 60, and/or the A/T gear ratio actuator 40 in order that the actual vehicular velocity V(t) is made equal to the command to the command value V*(t) of the vehicular velocity.

As appreciated from the equation (15), as the specific angular frequency ωc in the inter-vehicle distance feedback control system becomes large, the first gain fL by which the target inter-vehicle distance deviation {$L_T(t)–L(t)$} in the equation (16) is multiplied becomes large and the second gain by which the target relative velocity deviation {$ΔV_T(t)–ΔV(t)$} is multiplied becomes small. Since the specific angular frequency ωc is set to be a larger value as the relative velocity ΔV(t) becomes large as shown in FIG. 15, the first gain fL becomes large but the second gain fv becomes small as the relative velocity value ΔV(t) becomes large.

Hence, in the situation where the vehicle is approaching to the preceding vehicle whose relative velocity ΔV(t) is high (large) as shown in FIG. 11, the target inter-vehicle distance deviation {$L_T(t)–L(t)$} is fedback to a large degree and the target relative velocity deviation {$L_T(t)–ΔV(t)$} is fedback to a small degree.

In other words, even if the target inter-vehicle distance deviation {$L_T(t)–L(t)$} is small, the command value V*(t) of the vehicular velocity is largely varied so that the response characteristic in the inter-vehicle distance control system becomes fast.

At this time, in addition, the command value V*(t) of the vehicular velocity is not largely varied even if the target relative velocity deviation {$ΔV_T(t)–ΔV(t)$} is large. No abrupt deceleration is carried out even if the relative velocity ΔV(t) is large (high).

Hence, in the situation of FIG. 11 where the vehicle follows up the preceding vehicle whose relative velocity is large, a slow deceleration of the vehicle but a quick arrival at the target inter-vehicle distance can be achieved to provide the feeling of relief for the vehicular occupant(s).

On the other hand, since a small value is set to be the specific angular velocity ωc in the inter-vehicle distance feedback control system as the relative velocity ΔV(t) becomes small (low), the first gain fL by which the target inter-vehicle distance deviation {$L_T(t)–L(t)$} in the equation (16) is multiplied becomes reduced but the second gain fv by which the target relative velocity deviation {$ΔV_T(t)–ΔV(t)$} is multiplied becomes increased.

Hence, in the situation where the vehicle follows up the preceding vehicle whose relative velocity ΔV(t) is small as shown in FIGS. 12 and 13, the target inter-vehicle distance deviation {$L_T(t)–L(t)$} is fedback to a small degree in the calculation of the command value V*(t) in the equation (16) and the target relative velocity deviation {$ΔV_T(t)–ΔV(t)$} is fedback to a large degree.

In other words, although the target inter-vehicle distance deviation {$L_T(t)–L(t)$} is large, the command value V*(t) is not largely varied and the response characteristic in the distance feedback control system becomes slow.

It is noted that, at this time, even if the target relative velocity deviation {$ΔV_T(t)–V(t)$} is largely fedback, the relative velocity ΔV(t) itself is so small that the command value V*(t) of the vehicular velocity is not so largely varied and the abrupt deceleration is not carried out. Hence, in the situation where the vehicle follows up the preceding vehicle whose relative velocity ΔV(t) is small, no abrupt deceleration is carried out and the inter-vehicle distance can slowly be expanded.

In addition, such the abrupt deceleration as to give the vehicular run disagreeable to the vehicular occupant(s) in the case of the comparative example does not occur.

It is noted that the hardware structure of the automatic vehicular control apparatus in the third embodiment is the same as that shown in FIGS. 1A and 1B.

(Fourth Embodiment)

In the third embodiment, the first gain fL by which the target inter-vehicle distance deviation {$L_T(t)–L(t)$} is multiplied is increased to improve the response characteristic in the inter-vehicle distance feedback control system to make the actual inter-vehicle distance L(t) equal to the target inter-vehicle distance $L_T(t)$. However, there is a trade-off relationship such that the increase in the first gain fL causes the decrease in the stability in the system.

In a fourth embodiment of the automatic vehicular velocity control apparatus, the feedforward loop is added to the inter-vehicle distance feedback control system so as to provide the desired target inter-vehicle distance response characteristic from the inter-vehicle distance command value L*(T). The compensated command value Vc of the vehicular velocity corrects the command value of the vehicular velocity V*(t) derived by the inter-vehicle distance feedback control system.

Thus, the inter-vehicle distance feedback control system can improve the response characteristic without sacrifice of the stability.

Figure 17A:
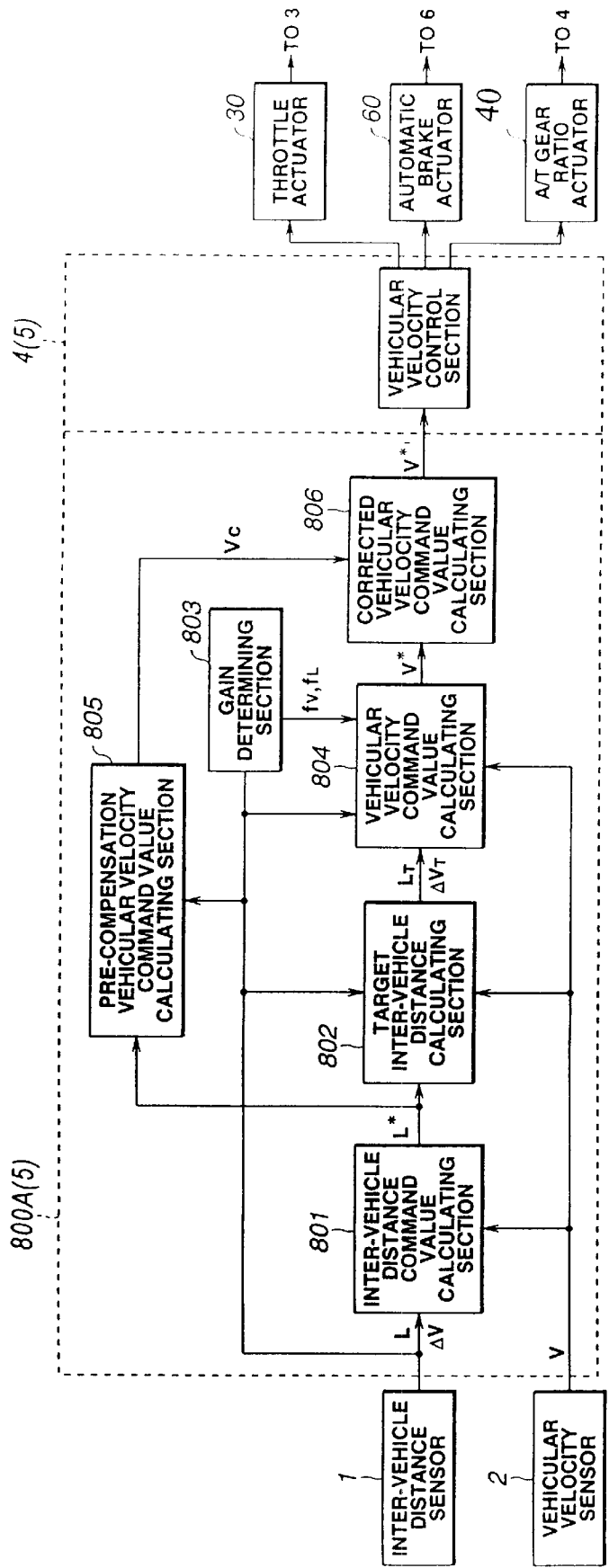
FIG. 17A is a functional block diagram of the automatic vehicular velocity control apparatus in a fourth preferred embodiment of the automatic vehicular velocity control apparatus according to the present invention.

FIG. 17A shows the functional block diagram of the automatic vehicular velocity control apparatus in the fourth embodiment.

It is noted that the same reference numerals shown in FIG. 17A as those in FIG. 14 correspond to like elements in the third embodiment shown in FIG. 14 and the detailed explanations thereof are omitted herein.

The preceding vehicle follow-up run controller 800A(5) shown in FIG. 17A includes the pre-compensated vehicular velocity command calculating section 805 and the corrected vehicular velocity command value calculating section 806.

The pre-compensated vehicular velocity command value calculating section 805 calculates the compensated vehicular velocity command value Vc by carrying out the filtering process of an equation (17) of TABLE 4.

The filter expressed in the equation (17) of TABLE 4 is represented by the product between the inverse of the transfer function from the vehicular velocity command value V*(t) to the actual inter-vehicle distance L(t) and the responsive characteristic of the target inter-vehicle distance $L_T(t)$ shown in the equation (14).

It is noted that the transfer function from the command value V*(t) of the vehicular velocity up to the actual inter-vehicle distance L(t) is represented by the product between the transfer function Gv(s) (refer to the equation (1)) in the vehicular velocity control system into which the command value V*(t) of the vehicular velocity is inputted and from which the actual vehicular velocity V(t) is outputted and the difference between the actual vehicular velocity $V_T(t)$ of the preceding vehicle, i.e., the integrator to integrate the relative velocity to achieve the actual inter-vehicle distance L(t). It is noted that the initial values to calculate the actual inter-vehicle distance L(t) are the inter-vehicle distance L0 and the relative velocity ΔV0 immediately after the vehicle has just been recognized the preceding vehicle.

The corrected vehicular velocity command value calculating section 806 adds the compensated vehicular velocity command value V*(t) calculated in the inter-vehicle distance feedback control system to derive the corrected command value V*'(t) of the vehicular velocity.

$$V^{*'}(t)=V_T(t)-V^*(t)-Vc \qquad (18).$$

The vehicular velocity control section 4 adjustably controls at least one of the throttle actuator 30, the automatic brake actuator 60, the A/T gear ratio actuator 40 to make the actual vehicular velocity equal to the corrected command value V*'(t).

FIGS. 18A, 18B, 18C, 18D, 19A, 19B, 19C, 19D, 20A, 20B, 20C, and 20D show the results of simulations in a case where the vehicle whose vehicular velocity was V=90 Km/h, the vehicular velocity $V_T$ of the preceding vehicle was 60 Km/h, and the vehicle has recognized the presence of the preceding vehicle at the inter-vehicle distance of 120 m, and the vehicle has started to follow up the preceding vehicle.

FIGS. 18A through 18D show the results of simulations of the inter-vehicle distance, the vehicular velocity, the relative velocity, and the accelerations in the automatic vehicular velocity control apparatus in either of the first or the second embodiment when the specific angular frequency ωc was lowered.

FIGS. 19A through 19D show those results of simulations thereof in a case where the specific angular frequency is lowered.

FIGS. 20A through 20D show those results of simulations thereof in each of the third and fourth embodiments. In FIGS. 18A through 20D, each solid line denotes the target value and the broken line denotes the actual value.

In a case wherein the vehicle follows up the preceding vehicle whose relative velocity value ΔV(t) is large, the response in the inter-vehicle distance control system is quickened with the specific angular frequency in each of the first and second embodiments increased.

As shown in FIGS. 18A through 18D, the large variation in the deceleration occurs after the preceding vehicle follow-up run start although the actual inter-vehicle distance L(t) is made coincident with the target inter-vehicle distance $L_T(t)$.

In addition, if the response in the inter-vehicle distance control system is made slow with the specific angular frequency lowered in each of the first and second embodiments, the variation in the deceleration becomes moderate as shown in FIGS. 19A through 19D but the actual inter-vehicle distance L(t) largely overshoot the target inter-vehicle distance $L_T(t)$. This gives the vehicular occupant(s) a feel of anxiety.

However, in each of the third and fourth embodiments, even if the vehicle follows up the preceding vehicle whose relative velocity ΔV(t) is large (high), the actual vehicular velocity L(t) is varied in such a manner as to be made substantially coincident with the target inter-vehicle distance $L_T(t)$ as shown in FIGS. 20A through 20D and no remarkable variation in the acceleration (deceleration) occurs after the preceding vehicle follow-up run start.

FIGS. 21A, 21B, 21C, 21D, 22A, 22B, 22C, 22D, 23A, 23B, 23C, and 23D show the results of the simulations when the preceding vehicle whose relative velocity was ΔV=60 Km/h was recognized at the inter-vehicle distance of 70 m during the vehicular run at V=74 Km/h.

FIGS. 21A through 21D show the results of simulations when the specific angular frequency in the inter-vehicle distance feedback control system in each of the first and second preferred embodiments is increased.

FIGS. 22A through 22D show the results of simulations when the specific angular frequency in the inter-vehicle distance feedback control system in each of the first and second preferred embodiments is lowered.

FIGS. 23A through 23D show the results of simulations when each of the third and fourth embodiments is operated.

In FIGS. 21A through 23D, the solid line denotes the target value and the broken line denotes the actual value.

In a case where the vehicle follows up the preceding vehicle whose relative velocity is small (low), the response in the inter-vehicle distance control system is quickened with the specific angular frequency increased in either of the first or second embodiment. At this time, although the actual inter-vehicle distance L(t) is varied in such a manner as to be made substantially coincident with the target inter-vehicle distance $L_T(t)$ as shown in FIGS. 21A through 21D but the large deceleration variation occurs after the follow-up run start.

It is noted that in the case where the response in the inter-vehicle distance control system is made slow with the specific angular frequency in either of the first or second embodiment lowered, the actual inter-vehicle distance L(t) is varied in such a manner as to be made substantially coincident with the target inter-vehicle distance $L_T(t)$ and moderate variation in the deceleration occurs.

It is noted that in a case where the response in the inter-vehicle distance control system is made slow with the specific angular frequency increased and with the response in the inter-vehicle distance control system quickened in each of the first and second preferred embodiments, the actual inter-vehicle distance L(t) is varied in such a manner as to be substantially made coincident with the target inter-vehicle distance $L_T(t)$ and the variation in the deceleration becomes moderate.

In a case where the vehicle follows up the preceding vehicle whose relative velocity ΔV(t) is small (low) in each of the third and fourth preferred embodiments, the actual inter-vehicle distance L(t) is varied in such a manner as to be substantially made coincident with the target inter-vehicle distance $L_T(t)$ and no large variation in the deceleration occurs after the start of the follow-up run.

As described above, since the first gain fL by which the target inter-vehicle distance deviation {$L_T(t)-L(t)$} in the inter-vehicle distance feedback control system is multiplied and the second gain fv by which the target relative velocity deviation {$\Delta V_T(t)-\Delta V(t)$} in the inter-vehicle distance feedback control system is multiplied are set in accordance with the relative velocity ΔV(t), the optimum inter-vehicle control response characteristic can be achieved in various preceding vehicle follow-up run situations. No large variation occurs after the start of the preceding vehicle follow-up run.

In addition, since the first gain fL by which the target inter-vehicle distance deviation {$L_T(t)-L(t)$} is multiplied is increased, the response in the inter-vehicle distance control system becomes fast, the follow-up capability of the actual inter-vehicle distance to the target inter-vehicle distance $L_T(T)$ can be raised.

In a case where the vehicle follows up the preceding vehicle whose relative velocity ΔV(t) is large, a quick arrival to the target inter-vehicle distance $\Delta V_T(t)$ can be achieved and the feeling of the disburden can be given to the vehicular occupant(s).

In addition, in the automatic vehicular velocity control apparatus according to the present invention, the response characteristic an be increased without sacrifice of the stability in the inter-vehicle distance feedback control system.

It is noted that since, in each of the third and fourth embodiments, the first gain fL by which the target inter-vehicle distance feedback control system is multiplied and the second gain fv by which the target relative velocity deviation {$\Delta V_T(t)-\Delta V(t)$} in the above-described control system is multiplied are set in accordance with the relative velocity ΔV(t).

Only the first gain fL by which the target inter-vehicle distance deviation {$L_T(t)-L(t)$} in the inter-vehicle distance feedback control system may be set in accordance with the relative velocity ΔV(t) and the command value V*(t) of the vehicular velocity may be calculated by subtracting the target inter-vehicle distance deviation fL {L_T(t)−L(t)} multiplied by the first gain fL from the vehicular velocity of the preceding vehicle V_T(t)(=V(t)+ΔV(t)).

Figure 17B:
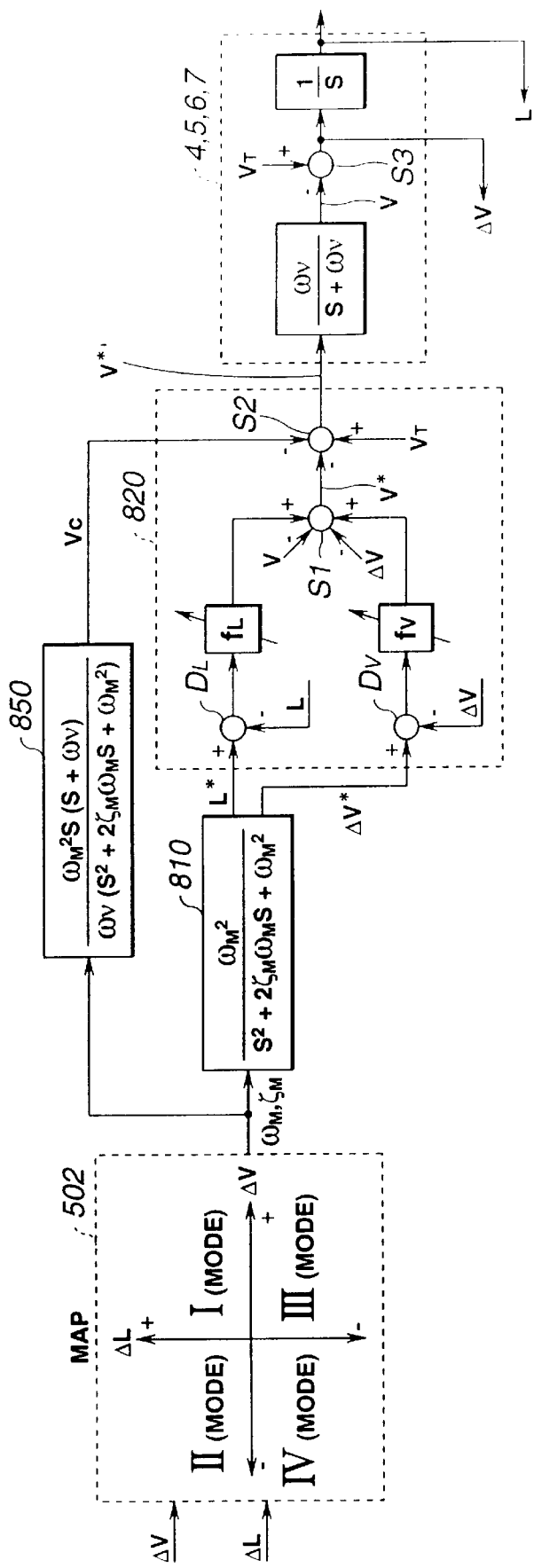
FIG. 17B is a functional block diagram of the inter-vehicle distance control system and the vehicular velocity control system of the automatic vehicular velocity control apparatus as an alternative of the fourth preferred embodiment of the automatic vehicular velocity control apparatus according to the present invention.
Figure 18A:
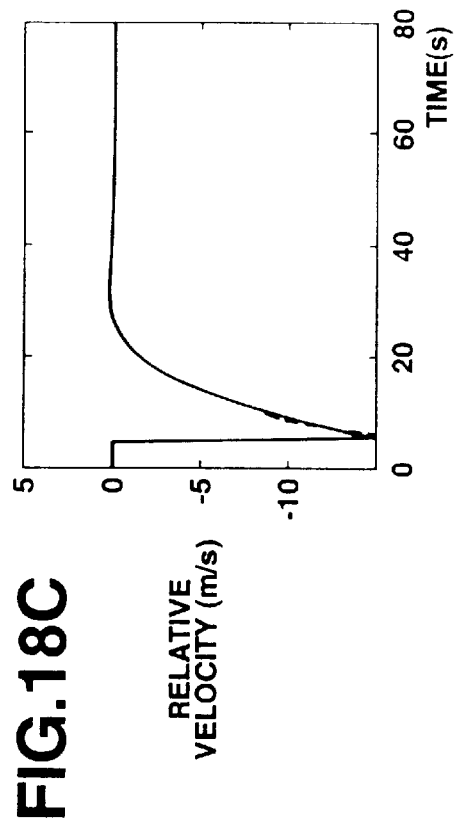
FIGS. 18A, 18B, 18C, and 18D are graphs on simulation results of the inter-vehicle distance, the vehicular velocity, the relative velocity, and the acceleration of the automatic vehicular velocity control apparatus in each of the first and second embodiments when the specific angular frequency in the inter-vehicle distance control system is made high.
Figure 18C:
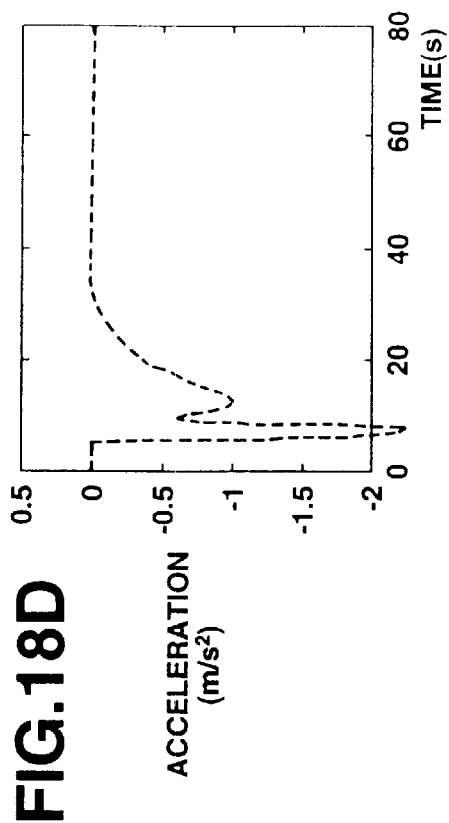
Figure 18B:
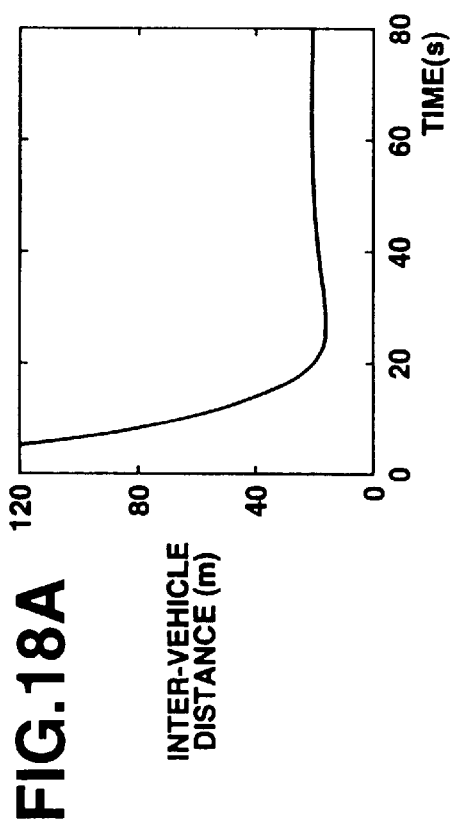
Figure 18D:
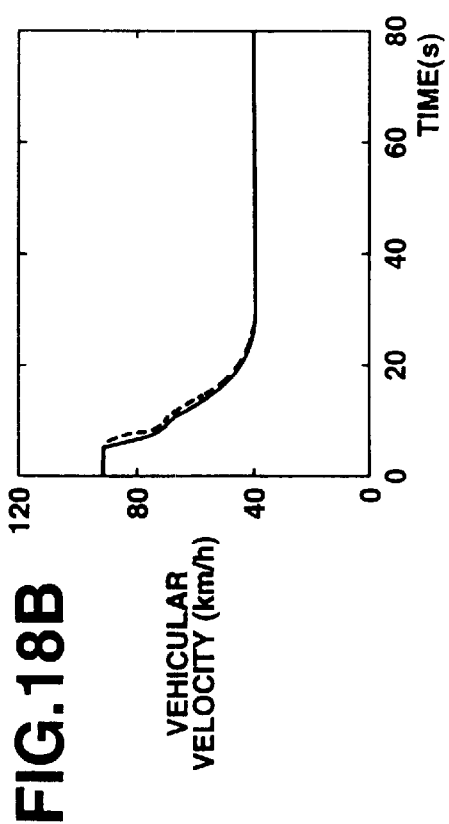
Figure 19A:
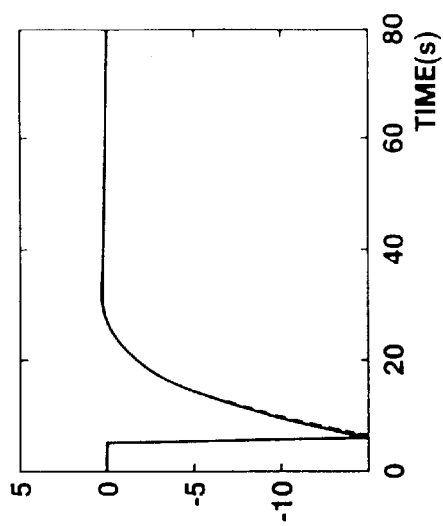
FIGS. 19A, 19B, 19C, and 19D are graphs on the simulation results of the inter-vehicle distance, the vehicular velocity, the relative velocity, and the acceleration of the automatic vehicular velocity control apparatus in each of the first and second embodiments when the specific angular frequency in the inter-vehicle distance control system is made low and the vehicle is following up the preceding vehicle, with the relative velocity being high.
Figure 19C:
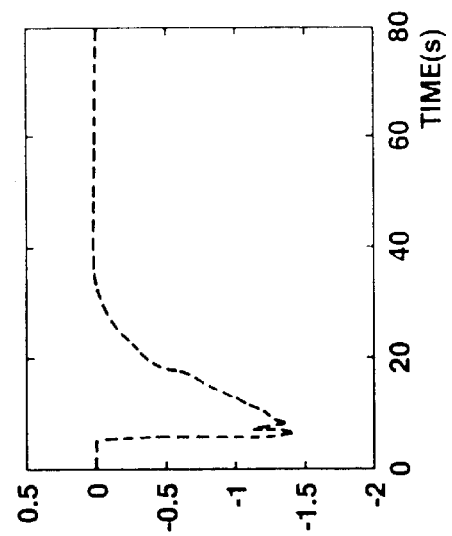
Figure 19B:
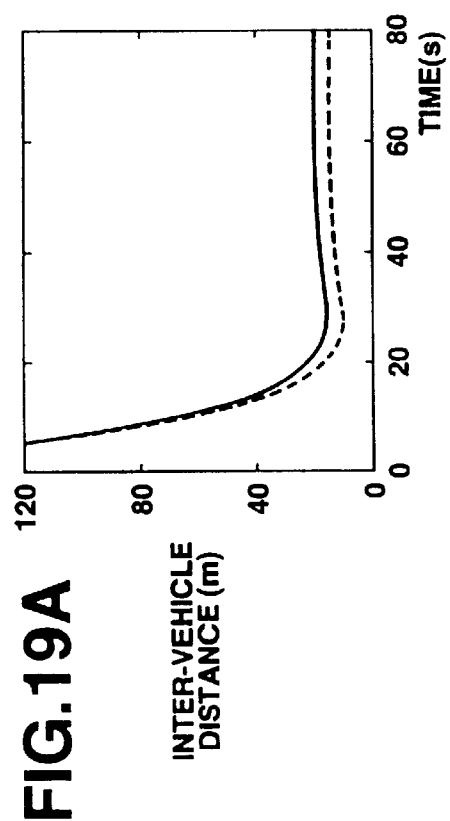
Figure 19D:
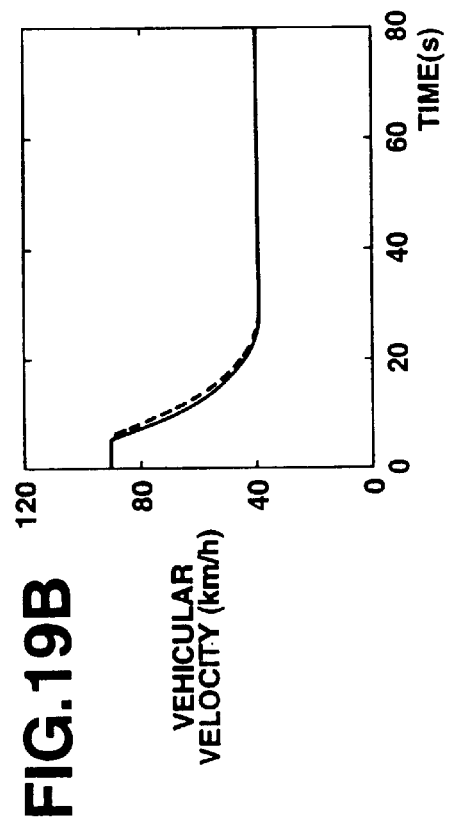
Figure 20C:
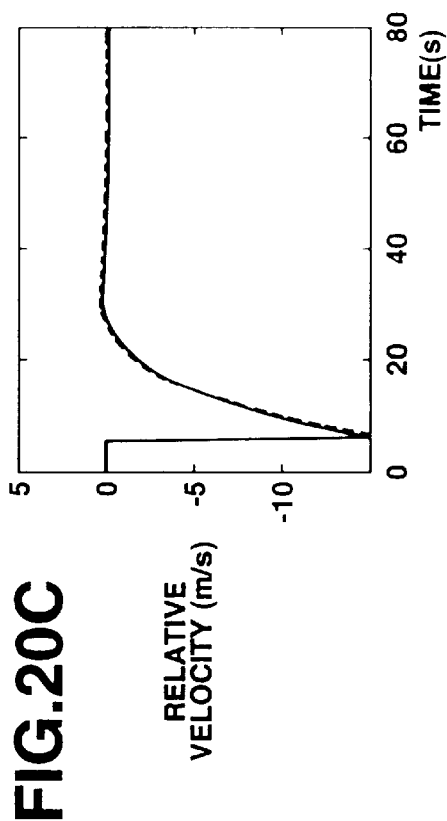
FIGS. 20A, 20B, 20C, and 20D are graphs on the simulation results of the inter-vehicle distance, the vehicular velocity, the relative velocity, and the acceleration of the automatic vehicular control apparatus in each of the third and fourth preferred embodiments when the vehicle is following up the preceding vehicle, with the relative velocity being high.
Figure 20D:
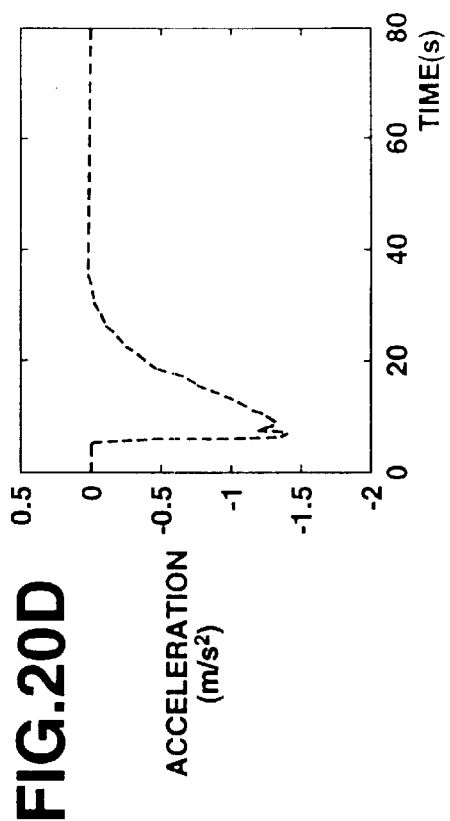
Figure 20A:
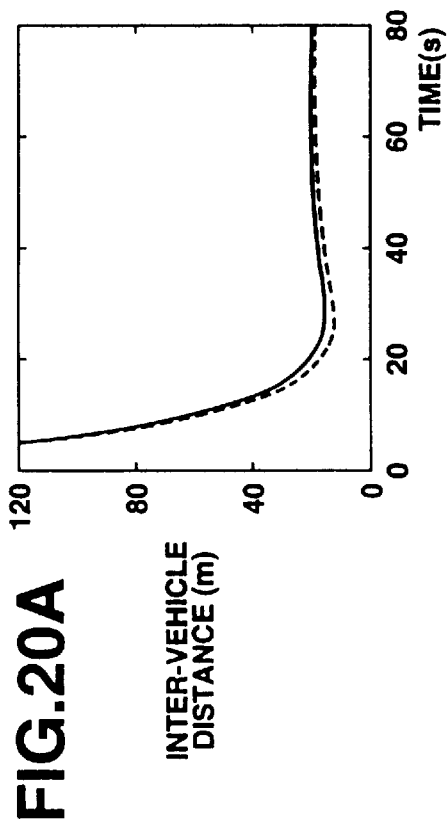
Figure 20B:
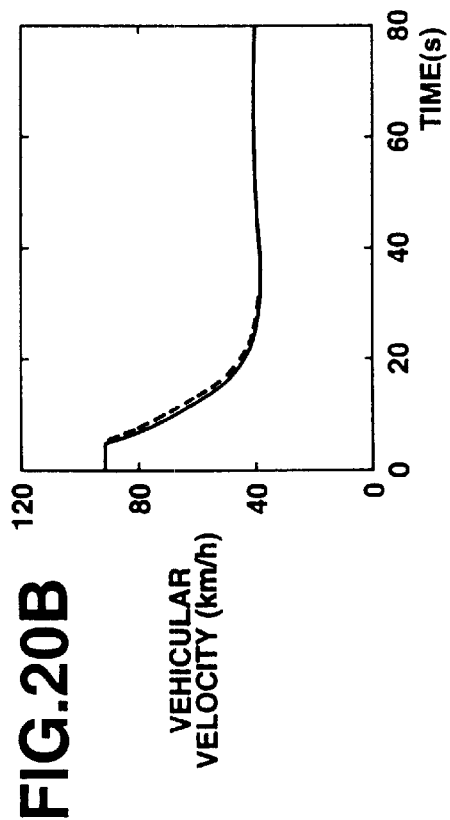
Figure 21C:
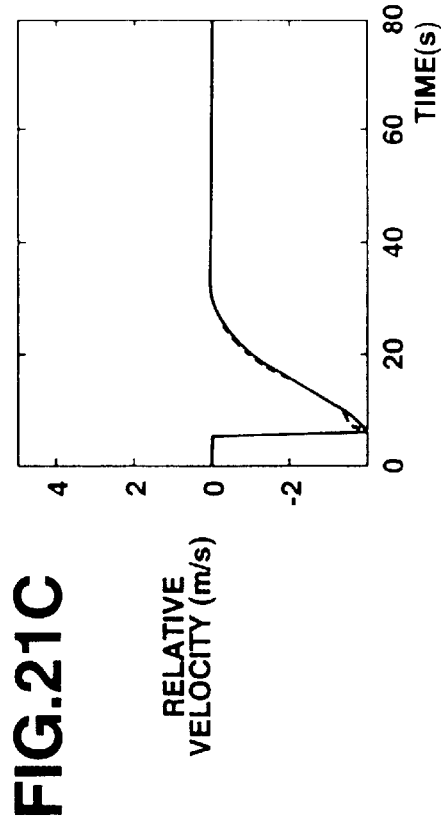
FIGS. 21A, 21B, 21C, and 21D are graphs on the simulation results of the inter-vehicle distance, the vehicular velocity, the relative velocity, and the acceleration of the automatic vehicular control apparatus in each of the third and fourth preferred embodiments when the vehicle is following up the preceding vehicle, with the relative velocity being high.
Figure 21D:
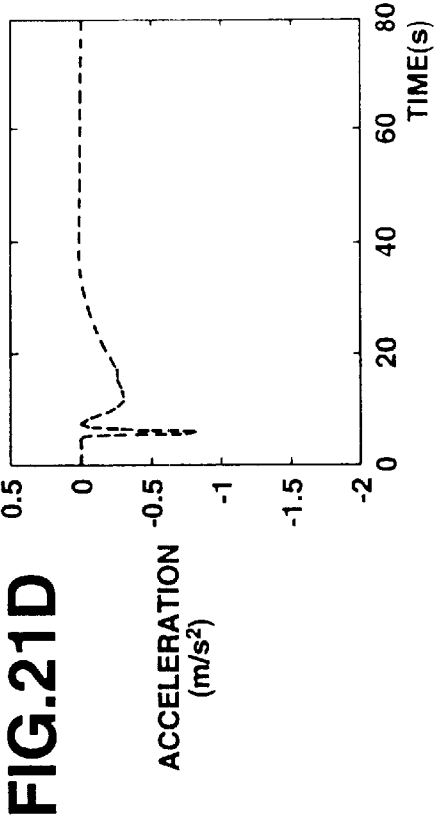
Figure 21A:
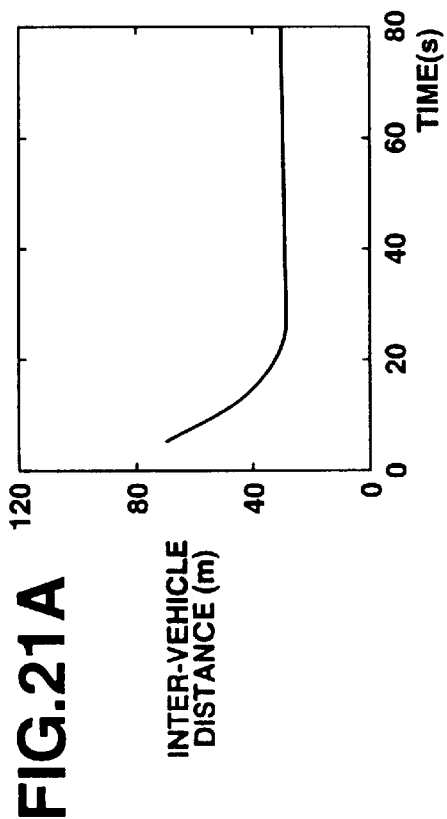
Figure 21B:
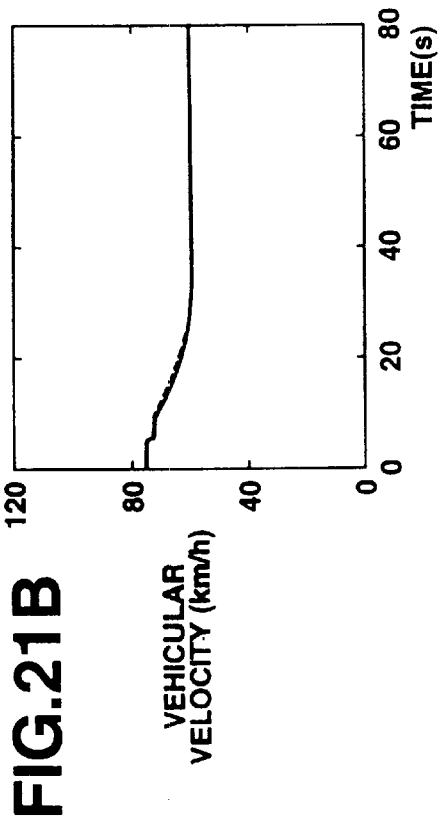
Figure 22C:
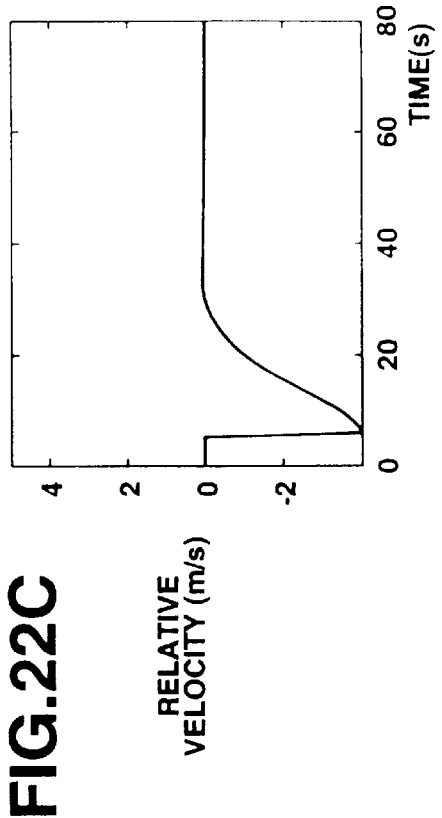
FIGS. 22A, 22B, 22C, and 22D are graphs on the simulation results of the inter-vehicle distance, the vehicular velocity, the relative velocity, and the acceleration of the automatic vehicular control apparatus in each of the first and second preferred embodiments when the vehicle is following up the preceding vehicle, with the relative velocity being low.
Figure 22D:
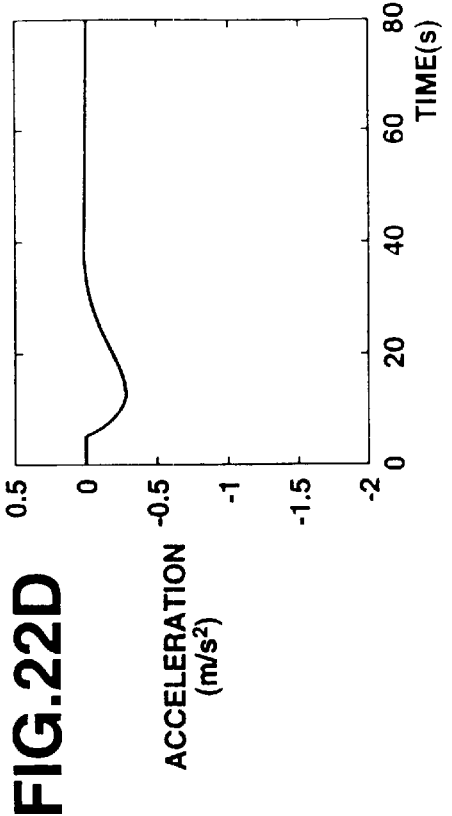
Figure 22A:
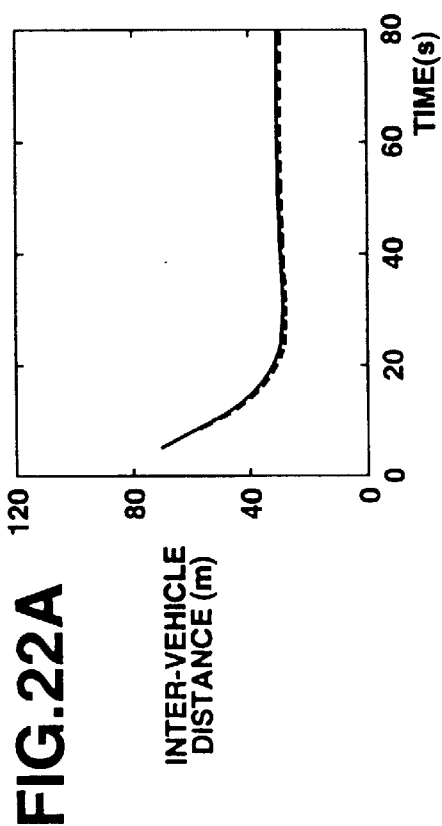
Figure 22B:
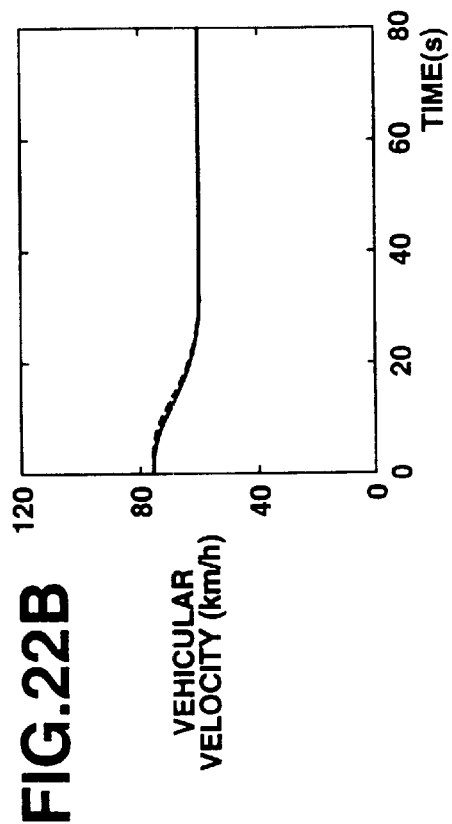
Figure 23A:
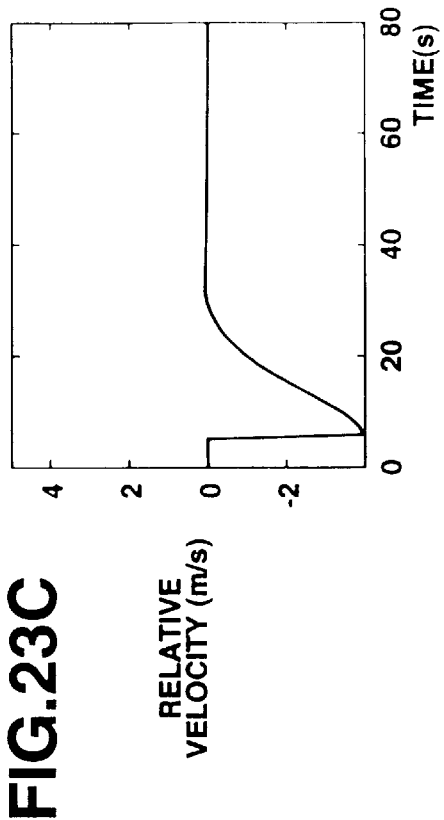
FIGS. 23A, 23B, 23C, and 23D are graphs on the simulation results of the inter-vehicle distance, the vehicular velocity, the relative velocity, and the acceleration of the automatic vehicular control apparatus in each of the third and fourth preferred embodiments when the vehicle is following up the preceding vehicle, with the relative velocity being low.
Figure 23C:
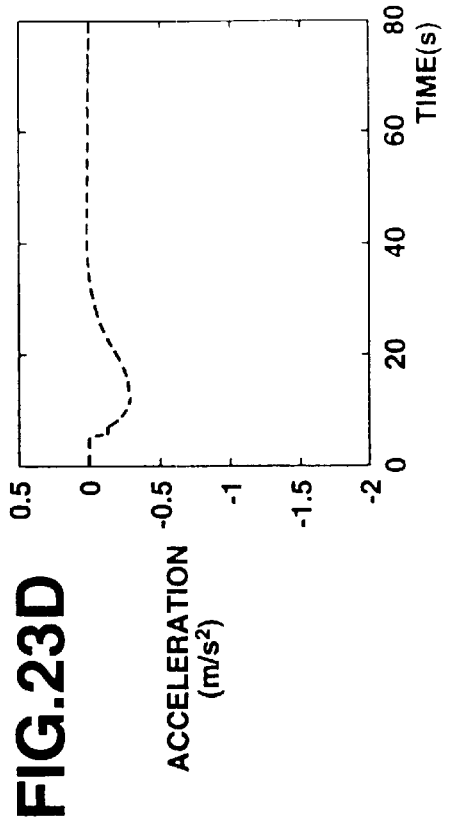
Figure 23B:
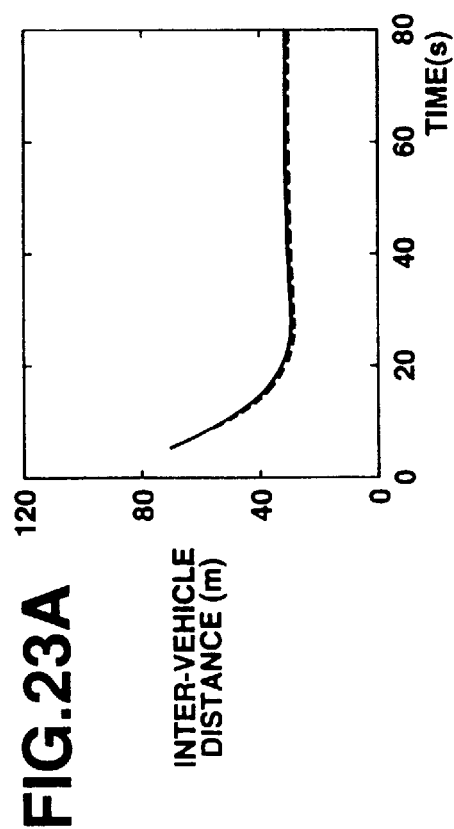
Figure 23D:
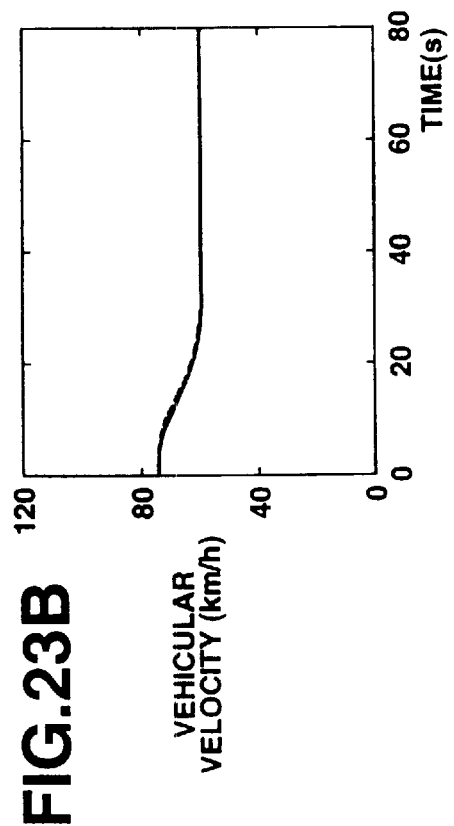

FIG. 17B shows an alternative of the fourth preferred embodiment of the automatic vehicular velocity control apparatus according to the present invention.

As shown in FIG. 17B, the coefficients determining section 502 corresponds to the maps shown in TABLE 1 and TABLE 2 and shown in FIG. 3 and the target inter-vehicle distance calculating section 810 having the transfer function expressed as $\omega_M^2/(s^2+2\zeta_M\omega s+\omega_M^2)$ derives the target inter-vehicle distance L* (or L_T) and the target relative velocity ΔV* (or ΔV_T).

The vehicular velocity command value calculating section 820 includes: a first subtractor $D_L$ to subtract the target inter-vehicle distance L* from the actual inter-vehicle distance L to derive the target inter-vehicle distance deviation (L*−L, namely, {L_T(t)−L(t)}); a second subtractor Dv to subtract the target relative velocity ΔV* from the actual relative velocity ΔV to derive the target relative velocity deviation (ΔV*−ΔV, namely, {ΔV_T(t)−ΔV(t)}); a first multiplier having the first gain fL by which the subtraction result is multiplied to derive fL×(L*−L); a second multiplier having the second gain fv by which the subtraction result is multiplied to derive fv×(ΔV*−ΔV); a summer S1 to add the vehicular velocity V to the relative velocity ΔV and subtract fL×(L*−L)+fv×(ΔV*−ΔV) from the added result of (V+ΔV) to output (V+ΔV)−{fL×(L*−L)+fv×(ΔV*−ΔV)} (this calculation is the same as the equation (16)) as the target vehicular velocity V*; and an adder S2 to add the summed result from the summer S1 to the compensated command value Vc of the vehicular velocity command value calculating section 850 to derive the final command value V*' of the vehicular velocity (V*'=V_T−V*−Vc). The pre-compensated vehicular velocity command value calculating section 850 has the transfer function as given by $\omega_M^2 s(s+\omega v)/\omega v(s^2+2\zeta_M\omega_M s+\omega_M^2)$. The individual numerical values of the specific angular frequency $\omega_M$ and the damping factor $\zeta M$ are derived from the maps 502 according to the relative velocity ΔV and the inter-vehicle distance deviation ΔL.

Each of the numerical values of ωM and ζM is previously distributed into the maps in accordance with the signed values of the inter-vehicle distance deviation ΔL and of the relative velocity ΔV of the vehicle to the preceding vehicle.

In FIG. 17B, the numerical values of each of the specific angular frequency ωM and the damping factor ζM are previously stored in a first quadrant of the respective maps to cope with the situation (I mode) in which the relative velocity ΔV is positively large and the inter-vehicle distance deviation ΔL is positively large such that the vehicle has made the traffic lane change to overtake the old preceding vehicle and has followed up the new preceding vehicle whose relative velocity is large(as shown in FIG. 13), are previously stored in a second quadrant of the respective maps to cope with the situation (II mode) in which the relative velocity ΔV is negatively small and the inter-vehicle distance deviation ΔL is negatively small such that the other vehicle is interrupted into the same traffic lane as the vehicle as the interrupt vehicle (as shown in FIG. 12), and are previously stored in a fourth quadrant (III mode) in which the relative velocity ΔV is positive and the inter-vehicle distance deviation ΔV is negative such that the new preceding vehicle whose relative velocity is large is recognized at the overtake traffic lane to which the vehicle has made the traffic lane change.

It is noted that a symbol of s denotes a Laplace transform operator and the relative velocity which is large means that the velocity of the preceding vehicle is lower than that of the vehicle and that the relative velocity is large in the negative direction (since ΔV=Vt−V).

It is noted that an inter-vehicle distance (feedback) control system defined in the appended claims includes the inter-vehicle distance sensor 1; the vehicular velocity sensor 2; the inter-vehicle distance command value calculating section 501 (801); the coefficients determining section 502; the target inter-vehicle distance calculating section 503 (802); and the vehicular velocity command value calculating section 504 (803, 804) in each of the first, second, third, and fourth embodiments and includes the sections 810 and 820 shown in FIG. 17B and the vehicular velocity control system includes the vehicular velocity control section 4 and the vehicular velocity sensor 2 in each embodiment.

It is also noted that the comparative example described in the specification is the previously proposed automatic vehicular velocity control apparatus described in the Japanese Patent Application Publication No. Heisei 11-59222 published on Mar. 12, 1999.

The entire contents of Japanese Patent Applications Heisei 10-240180 (filed in Japan on Aug. 26, 1998) and Heisei 11-166828 (filed in Japan on Jun. 14, 1999) are incorporated herein by reference.

Although the present invention has been described by reference to certain embodiments described above, the present invention is not limited to the embodiments described above. Modifications and variations of the embodiments will occur to those skilled in the art in light of the above teachings.

The scope of the present invention is defined with reference to the following claims.

TABLE 1

| Relative Velocity | | Inter-Vehicle Distance Deviation (Actual Inter-Vehicle Distance − Target Inter-Vehicle Distance) m | | | | | | | | | | | | | | |
|---|---|---|---|---|---|---|---|---|---|---|---|---|---|---|---|---|
| km/h | m/s | −20 | −16 | −12 | −8 | −4 | 0 | 4 | 8 | 12 | 16 | 20 | 30 | 40 | 60 | 80 | 100 |
| | | | | | | | $\zeta_M$ MAP | | | | | | | | | | |
| −101 | −28 | 0.800 | 0.800 | 0.800 | 0.800 | 0.900 | 0.950 | 0.980 | 0.910 | 0.653 | 0.525 | 0.448 | 0.317 | 0.252 | 0.168 | 0.126 | 0.101 |
| −86.4 | −24 | 0.800 | 0.800 | 0.800 | 0.800 | 0.900 | 0.950 | 0.984 | 0.810 | 0.580 | 0.465 | 0.396 | 0.280 | 0.222 | 0.148 | 0.111 | 0.089 |
| −72 | −20 | 0.800 | 0.800 | 0.800 | 0.800 | 0.900 | 0.950 | 0.980 | 0.700 | 0.500 | 0.400 | 0.340 | 0.240 | 0.190 | 0.127 | 0.095 | 0.076 |
| −57.6 | −16 | 0.800 | 0.800 | 0.800 | 0.800 | 0.900 | 0.880 | 0.840 | 0.580 | 0.413 | 0.330 | 0.280 | 0.197 | 0.156 | 0.104 | 0.078 | 0.062 |
| −43.2 | −12 | 0.800 | 0.800 | 0.800 | 0.800 | 0.900 | 0.720 | 0.780 | 0.450 | 0.320 | 0.255 | 0.216 | 0.152 | 0.120 | 0.080 | 0.060 | 0.048 |
| −36 | −10 | 0.700 | 0.700 | 0.750 | 0.800 | 0.800 | 0.750 | 0.800 | 0.388 | 0.275 | 0.219 | 0.185 | 0.130 | 0.103 | 0.068 | 0.051 | 0.041 |
| −28.8 | −8 | 0.600 | 0.600 | 0.650 | 0.700 | 0.750 | 0.650 | 0.720 | 0.320 | 0.227 | 0.180 | 0.152 | 0.107 | 0.084 | 0.056 | 0.042 | 0.034 |

TABLE 1-continued

| Relative Velocity | | Inter-Vehicle Distance Deviation (Actual Inter-Vehicle Distance − Target Inter-Vehicle Distance) m | | | | | | | | | | | | | | |
|---|---|---|---|---|---|---|---|---|---|---|---|---|---|---|---|---|
| km/h | m/s | −20 | −16 | −12 | −8 | −4 | 0 | 4 | 8 | 12 | 16 | 20 | 30 | 40 | 60 | 80 | 100 |
| −21.6 | −6 | 0.500 | 0.500 | 0.550 | 0.600 | 0.650 | 0.550 | 0.540 | 0.248 | 0.175 | 0.139 | 0.117 | 0.082 | 0.065 | 0.043 | 0.032 | 0.026 |
| −14.4 | −4 | 0.400 | 0.400 | 0.450 | 0.500 | 0.550 | 0.450 | 0.360 | 0.170 | 0.120 | 0.095 | 0.080 | 0.056 | 0.044 | 0.029 | 0.022 | 0.018 |
| −10.8 | −3 | 0.300 | 0.300 | 0.350 | 0.400 | 0.400 | 0.350 | 0.270 | 0.131 | 0.093 | 0.073 | 0.062 | 0.043 | 0.033 | 0.022 | 0.017 | 0.013 |
| −7.2 | −2 | 0.200 | 0.200 | 0.250 | 0.300 | 0.300 | 0.250 | 0.180 | 0.090 | 0.063 | 0.050 | 0.042 | 0.029 | 0.022 | 0.015 | 0.011 | 0.009 |
| 0 | 0 | 0.100 | 0.100 | 0.150 | 0.200 | 0.250 | 0.900 | 0.400 | 0.250 | 0.200 | 0.100 | 0.100 | 0.100 | 0.100 | 0.100 | 0.100 | 0.100 |
| 7.2 | 2 | 0.046 | 0.055 | 0.070 | 0.100 | 0.180 | 0.900 | 0.500 | 0.350 | 0.300 | 0.200 | 0.200 | 0.200 | 0.200 | 0.200 | 0.200 | 0.200 |
| 10.8 | 3 | 0.066 | 0.079 | 0.100 | 0.143 | 0.255 | 0.900 | 0.600 | 0.450 | 0.400 | 0.300 | 0.300 | 0.300 | 0.300 | 0.300 | 0.300 | 0.300 |
| 14.4 | 4 | 0.084 | 0.100 | 0.127 | 0.180 | 0.320 | 0.900 | 0.700 | 0.550 | 0.500 | 0.400 | 0.400 | 0.400 | 0.400 | 0.400 | 0.400 | 0.400 |
| 18 | 5 | 0.100 | 0.119 | 0.150 | 0.213 | 0.375 | 0.900 | 0.800 | 0.650 | 0.600 | 0.500 | 0.500 | 0.500 | 0.500 | 0.500 | 0.500 | 0.500 |

TABLE 2

| Relative Velocity | | Inter-Vehicle Distance Deviation (Actual Inter-Vehicle Distance − Target Inter-Vehicle Distance) m | | | | | | | | | | | | | | |
|---|---|---|---|---|---|---|---|---|---|---|---|---|---|---|---|---|
| km/h | m/s | −20 | −16 | −12 | −8 | −4 | 0 | 4 | 8 | 12 | 16 | 20 | 30 | 40 | 60 | 80 | 100 |
| | | | | | | | $\omega_M$ MAP | | | | | | | | | |
| −101 | −28 | 0.130 | 0.120 | 0.110 | 0.100 | 0.110 | 0.110 | 0.070 | 0.130 | 0.140 | 0.150 | 0.160 | 0.170 | 0.180 | 0.180 | 0.180 | 0.180 |
| −86.4 | −24 | 0.140 | 0.130 | 0.120 | 0.110 | 0.110 | 0.110 | 0.082 | 0.135 | 0.145 | 0.155 | 0.165 | 0.175 | 0.185 | 0.185 | 0.185 | 0.185 |
| −72 | −20 | 0.150 | 0.140 | 0.130 | 0.120 | 0.110 | 0.110 | 0.098 | 0.140 | 0.150 | 0.160 | 0.170 | 0.180 | 0.190 | 0.190 | 0.190 | 0.190 |
| −57.6 | −16 | 0.160 | 0.150 | 0.140 | 0.130 | 0.120 | 0.110 | 0.105 | 0.145 | 0.155 | 0.165 | 0.175 | 0.185 | 0.195 | 0.195 | 0.195 | 0.195 |
| −43.2 | −12 | 0.180 | 0.160 | 0.150 | 0.150 | 0.140 | 0.140 | 0.130 | 0.150 | 0.160 | 0.170 | 0.180 | 0.190 | 0.200 | 0.200 | 0.200 | 0.200 |
| −36 | −10 | 0.180 | 0.180 | 0.160 | 0.180 | 0.170 | 0.160 | 0.160 | 0.155 | 0.165 | 0.175 | 0.185 | 0.195 | 0.205 | 0.205 | 0.205 | 0.205 |
| −28.8 | −8 | 0.190 | 0.180 | 0.180 | 0.180 | 0.180 | 0.180 | 0.180 | 0.160 | 0.170 | 0.180 | 0.190 | 0.200 | 0.210 | 0.210 | 0.210 | 0.210 |
| −21.6 | −6 | 0.200 | 0.190 | 0.180 | 0.180 | 0.180 | 0.180 | 0.180 | 0.165 | 0.175 | 0.185 | 0.195 | 0.205 | 0.215 | 0.215 | 0.215 | 0.215 |
| −14.4 | −4 | 0.210 | 0.200 | 0.180 | 0.180 | 0.180 | 0.180 | 0.180 | 0.170 | 0.180 | 0.190 | 0.200 | 0.210 | 0.220 | 0.220 | 0.220 | 0.220 |
| −10.8 | −3 | 0.210 | 0.210 | 0.190 | 0.190 | 0.185 | 0.180 | 0.180 | 0.175 | 0.185 | 0.195 | 0.205 | 0.215 | 0.220 | 0.220 | 0.220 | 0.220 |
| −7.2 | −2 | 0.220 | 0.210 | 0.200 | 0.200 | 0.180 | 0.180 | 0.180 | 0.180 | 0.190 | 0.200 | 0.210 | 0.220 | 0.220 | 0.220 | 0.220 | 0.220 |
| 0 | 0 | 0.230 | 0.220 | 0.210 | 0.200 | 0.180 | 0.180 | 0.180 | 0.180 | 0.190 | 0.200 | 0.210 | 0.220 | 0.220 | 0.220 | 0.220 | 0.220 |
| 7.2 | 2 | 0.230 | 0.220 | 0.210 | 0.200 | 0.180 | 0.180 | 0.180 | 0.180 | 0.190 | 0.200 | 0.210 | 0.220 | 0.220 | 0.220 | 0.220 | 0.220 |
| 10.8 | 3 | 0.220 | 0.210 | 0.200 | 0.190 | 0.170 | 0.175 | 0.180 | 0.180 | 0.190 | 0.200 | 0.210 | 0.220 | 0.220 | 0.220 | 0.220 | 0.220 |
| 14.4 | 4 | 0.210 | 0.200 | 0.190 | 0.180 | 0.160 | 0.170 | 0.180 | 0.180 | 0.190 | 0.200 | 0.210 | 0.220 | 0.220 | 0.220 | 0.220 | 0.220 |
| 18 | 5 | 0.200 | 0.190 | 0.180 | 0.170 | 0.150 | 0.165 | 0.180 | 0.180 | 0.190 | 0.200 | 0.210 | 0.220 | 0.220 | 0.220 | 0.220 | 0.220 |

TABLE 3

$$Gv(s) = \frac{\omega v}{s + \omega v} \quad (1)$$

$$\frac{d}{dt}\begin{bmatrix} L_T(t) \\ \Delta V_T(t) \end{bmatrix} = \begin{bmatrix} 0 & 1 \\ -\omega_M^2 & -2\zeta_M\omega_M \end{bmatrix}\begin{bmatrix} L_T(t) \\ \Delta V_T(t) \end{bmatrix} + \begin{bmatrix} 0 \\ \omega_M^2 \end{bmatrix} L*(t) \quad (6)$$

$$\frac{L_T(s)}{L*(s)} = \frac{\omega_M^2}{s^2 + 2\zeta_M\omega_M s + \omega_M^2} \quad (7)$$

$$Gc(s) = \frac{Vc(s)}{L*(s)} = \frac{\omega_M^2 s(s + \omega v)}{\omega v(s^2 + 2\zeta_M\omega_M s + \omega_M^2)} \quad (9)$$

TABLE 4

$$\frac{d}{dt}\begin{bmatrix} L_T(t) \\ \Delta V_T(t) \end{bmatrix} = \begin{bmatrix} 0 & 1 \\ -\omega_M^2 & -2\zeta_M\omega_M \end{bmatrix}\begin{bmatrix} L_T(t) \\ \Delta V_T(t) \end{bmatrix} + \begin{bmatrix} 0 \\ \omega_M^2 \end{bmatrix} L*(t) \quad (13)$$

$$\frac{L_T(s)}{L*(s)} = \frac{\omega_M^2}{s^2 + 2\zeta_M\omega_M s + \omega_M^2} \quad (14)$$

$$Gc(s) = \frac{Vc(s)}{L*(s)} = \frac{\omega_M^2 s(s + \omega v)}{\omega v(s^2 + 2\zeta_M\omega_M s + \omega_M^2)} \quad (17)$$

What is claimed is:

1. An automatic vehicular velocity control apparatus for an automotive vehicle, comprising:

an inter-vehicle distance detector to detect an inter-vehicle distance from the vehicle to a preceding vehicle which is running ahead of the vehicle;

a vehicular velocity detector to detect a vehicular velocity of the vehicle;

a relative velocity detector to detect a relative velocity of the preceding vehicle to the vehicle;

an inter-vehicle distance command value calculator to calculate a command value of an inter-vehicle distance;

a target value determinator to determine a target value of the inter-vehicle distance prescribing a variation of the inter-vehicle distance with time until the detected value of the inter-vehicle distance has reached to the command value of the inter-vehicle distance;

a gain determinator to determine a first gain by which a deviation between the target value of the inter-vehicle distance and the detected value of the inter-vehicle distance is multiplied in accordance with the detected value of the relative velocity;

a vehicular velocity command value calculator to calculate a command value of the vehicular velocity to make the detected value of the inter-vehicle distance equal to the target value of the inter-vehicle distance on the basis of the detected value of the vehicular velocity, the detected value of the relative velocity, and the deviation between the target value of the inter-vehicle distance and the detected value thereof; and a vehicular velocity control section to control at least one of a driving force of the vehicle, a braking force of the vehicle, and a gear ratio of a vehicular transmission in such a manner that the detected value of the vehicular velocity is made equal to the command value thereof.

2. An automatic vehicular velocity control apparatus for an automotive vehicle as claimed in claim 1, wherein the target value determinator further determines a target value of the relative velocity prescribing the variation of the relative velocity with time until the detected value of the inter-vehicle distance has reached to the command value of the inter-vehicle distance, the gain determinator further determines a second gain by which another deviation between the target value of the relative velocity and the detected value thereof is multiplied in accordance with the detected value of the relative velocity, and the vehicular velocity command value calculator calculates the command value of the vehicular velocity to make the detected value of the inter-vehicle distance equal to the target value thereof on the basis of the deviation multiplied by the first gain the other deviation multiplied by the second gain.

3. An automatic vehicular velocity control apparatus for an automotive vehicle as claimed in claim 1, further comprising a correction value calculator to calculate a correction value Vc of the vehicular velocity from the inter-vehicle distance command value determined by the target value determinator using a filter having a transfer function including a transfer characteristic from the command value of the inter-vehicle distance determined by the target value determinator to the target value of the inter-vehicle distance and an inverse transfer characteristic of the transfer characteristic of the vehicular velocity control system to which an integration element is added and a vehicular velocity command value correction section to correct the command value of the vehicular velocity according to the corrected value of the vehicular velocity.

4. An automatic vehicular velocity control apparatus for an automotive vehicle as claimed in claim 3, wherein the gain determinator increases the first gain as the detected value of the relative velocity becomes large.

5. An automatic vehicular velocity control apparatus for an automotive vehicle as claimed in claim 1, wherein the gain determinator determines the first gain fL and the second gave fv as follows: $fL=\omega c^2/\omega nv; fv=1-2\zeta c\omega c/\omega nv$, wherein $\omega c$ denotes a specific angular frequency, $\zeta c$ denotes a damping factor, both of the specific angular frequency and the damping factor being parameters to determine a response characteristic of an inter-vehicle distance feedback control system and being stored in a memory of the automatic vehicular velocity control apparatus in forms of respective maps in accordance with the detected value of the relative velocity and $\omega nv$ denotes a specific angular frequency of the vehicular velocity control system to make the detected value of the vehicular velocity equal to the command value thereof.

6. An automatic vehicular velocity control apparatus for an automotive vehicle as claimed in claim 5, wherein the vehicular velocity command value calculator calculates the command value $V^*(t)$ of the vehicular velocity as follows: $V^*(t)=\{V(t)+\Delta V(t)\}-[fv\times\{\Delta V_T(t)-\Delta V(t)\}+fL\times\{L_T(t)-L(t)\}]$, wherein V(t) denotes the detected value of the vehicular velocity, $\Delta V(t)$ denotes the detected value of the relative velocity, fv denotes the second gain, $\Delta V_T(t)$ denotes the target value of the relative velocity and $\Delta V(t)$ denotes the detected value of the relative velocity, fL denotes the first gain, $L_T(t)$ denotes the target value of the inter-vehicle distance, and L(t) denotes the detected value of the inter-vehicle distance.

7. An automatic vehicular velocity control apparatus for an automotive vehicle as claimed in claim 6, wherein the specific angular frequency $\omega c$ in the inter-vehicle distance feedback control system is stored in the corresponding one of the maps such that the value of the specific angular frequency $\omega c$ is increased in proportion to the increase in a magnitude of the detected value of the relative velocity.

8. An automatic vehicular velocity control method for an automotive vehicle, comprising: detecting an inter-vehicle distance from the vehicle to a preceding vehicle which is running ahead of the vehicle; detecting a vehicular velocity of the vehicle; detecting a relative velocity of the preceding vehicle; calculating a command value of the inter-vehicle distance; determining a target value of the inter-vehicle distance prescribing a variation of the inter-vehicle distance with time until the detected value of the inter-vehicle distance has reached to the command value of the inter-vehicle distance; determining a first gain by which a deviation between the target value of the inter-vehicle distance and the detected value of the inter-vehicle distance is multiplied in accordance with the detected value of the relative velocity; calculating a command value of the vehicular velocity to make the detected value of the inter-vehicle distance equal to the target value of the inter-vehicle distance as a function of the detected value of the vehicular velocity, the detected value of the relative velocity, and the deviation between the target value of the inter-vehicle distance and the detected value thereof; and controlling at least one of driving force of the vehicle, a braking force of the vehicle, and a gear ratio of a vehicular transmission in such a manner that the detected value of the vehicular velocity is made equal to the command value thereof.

9. An automatic vehicular velocity control method for an automotive vehicle as claimed in claim 8, wherein the calculating the command value of the inter-vehicle distance further comprises determining a target value of the relative velocity prescribing the variation of the relative with the time until the detected value of the inter-vehicle distance has reached to the command value of the inter-vehicle distance, the determining the first gain further comprises determining a second gain by which another deviation between the target value of the relative velocity and the detected value thereof is multiplied in accordance with the detected value of the relative velocity, and wherein the calculating the command value of the vehicular velocity further comprises calculating a command value of the vehicular velocity to make the detected value of the inter-vehicle distance equal to the target value of the inter-vehicle distance as a function of the detected value of the vehicular velocity, and the deviation between the target value of the inter-vehicle distance and detected value thereof.

10. An automatic vehicular velocity control method for an automotive vehicle as claimed in claim 8, further comprising: calculating a correction value of the vehicular velocity from the inter-vehicle distance command value using a filter having a transfer function including a transfer characteristic from the command value of the inter-vehicle distance and an inverse transfer characteristic of the vehicular velocity control system to which an integration element is added; and correcting the command value of the vehicular velocity according to the corrected value of the vehicular velocity.

* * * * *